(12) United States Patent
Kuznetsov et al.

(10) Patent No.: US 10,481,307 B2
(45) Date of Patent: Nov. 19, 2019

(54) OPTICAL ANTENNA

(71) Applicant: Agency for Science, Technology and Research, Singapore (SG)

(72) Inventors: Arseniy Kuznetsov, Singapore (SG); Yuan Hsing Fu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 358 days.

(21) Appl. No.: 15/302,476

(22) PCT Filed: Apr. 9, 2015

(86) PCT No.: PCT/SG2015/000118
§ 371 (c)(1),
(2) Date: Oct. 6, 2016

(87) PCT Pub. No.: WO2015/156737
PCT Pub. Date: Oct. 15, 2015

(65) Prior Publication Data
US 2017/0023710 A1 Jan. 26, 2017

(30) Foreign Application Priority Data
Apr. 9, 2014 (SG) .......................... 10201401366R

(51) Int. Cl.
G02B 5/00 (2006.01)
G02B 1/00 (2006.01)
(52) U.S. Cl.
CPC ............. *G02B 5/008* (2013.01); *G02B 1/002* (2013.01)
(58) Field of Classification Search
None
See application file for complete search history.

(56) References Cited

U.S. PATENT DOCUMENTS

| | | | |
|---|---|---|---|
| 2008/0225268 A1* | 9/2008 | Sigalas | G01N 21/658 356/36 |
| 2009/0002701 A1* | 1/2009 | Fattal | B82Y 15/00 356/301 |
| 2013/0294729 A1* | 11/2013 | Layton | B82Y 20/00 385/40 |

FOREIGN PATENT DOCUMENTS

WO 2014005147 A2 1/2014

OTHER PUBLICATIONS

Written Opinion of the International Searching Authority for International Application No. PCT/SG2015/000118 dated Jun. 29, 2015, pp. 1-4.
Krasnok et al., "Optical Nanoantennas," Physcis—Uspekhi, vol. 56, Issue 6, 2013, pp. 539-564.
(Continued)

*Primary Examiner* — William R Alexander
*Assistant Examiner* — Gary W O'Neill
(74) *Attorney, Agent, or Firm* — Winstead, P.C.

(57) ABSTRACT

According to embodiments of the present invention, an optical antenna is provided. The optical antenna includes at least one first particle, and at least one second particle having a diameter that is larger than a diameter of the at least one first particle, wherein the at least one first particle and the at least one second particle are arranged along a plane, and wherein the at least one first particle is configured to enhance an optical emission of at least one light source providing an optical signal to the optical antenna and the at least one second particle is configured to direct the optical signal in a direction at least substantially perpendicular to the plane.

19 Claims, 12 Drawing Sheets

(56) References Cited

OTHER PUBLICATIONS

Staude et al., "Tailoring Directional Scattering Through Magnetic and Electric Resonances In Subwavelength Silicon Nanodisks," ACS Nano, vol. 7, No. 9, 2013, pp. 7824-7832.
Zou et al., "Dielectric Resonator Nanoantennas at Visible Frequencies," Optics Express, vol. 21, No. 1, 2013, pp. 1344-1352.
International Preliminary Report on Patentability for International Application No. PCT/SG2015/000118 dated Oct. 12, 2016, pp. 1-6.

* cited by examiner

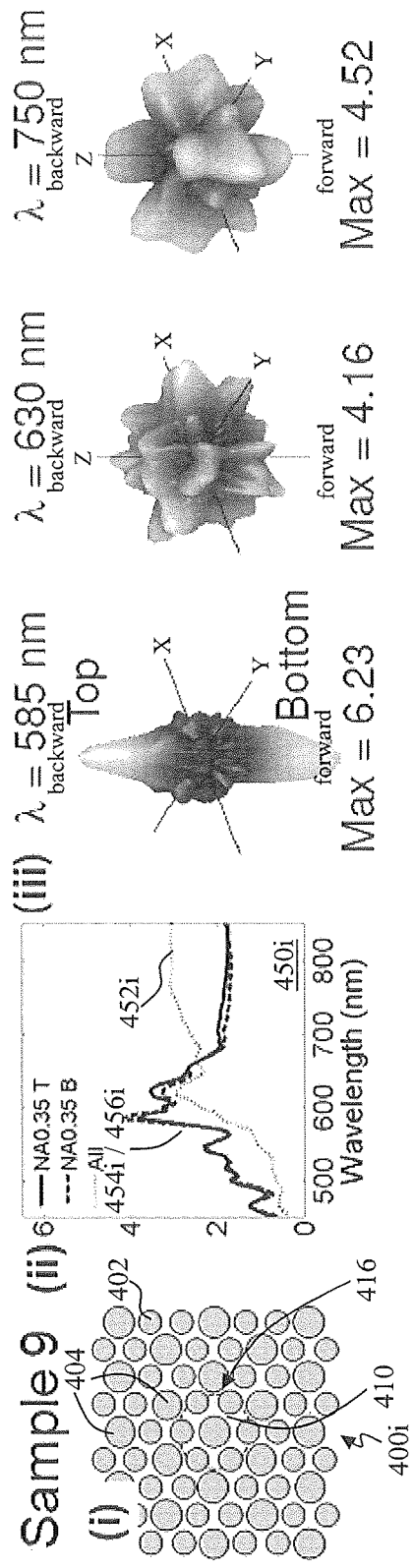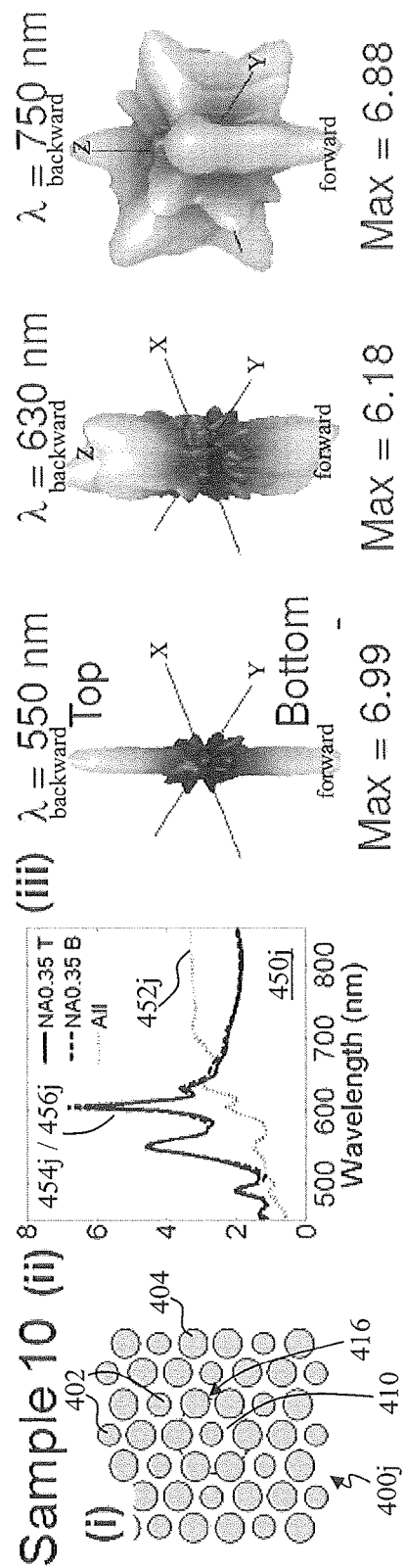
FIG. 4I
FIG. 4J

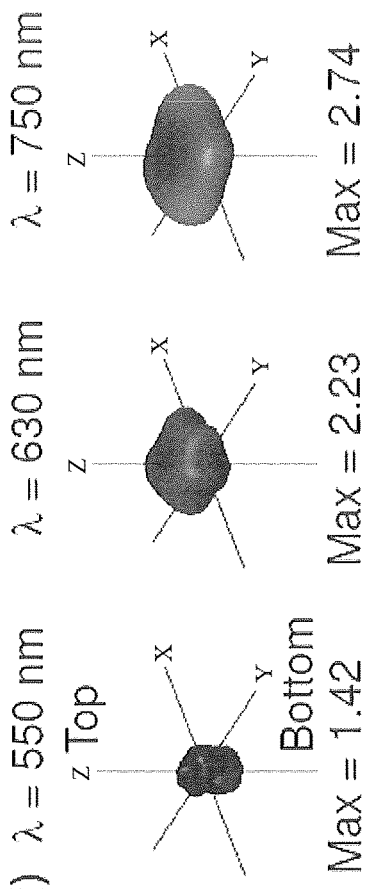
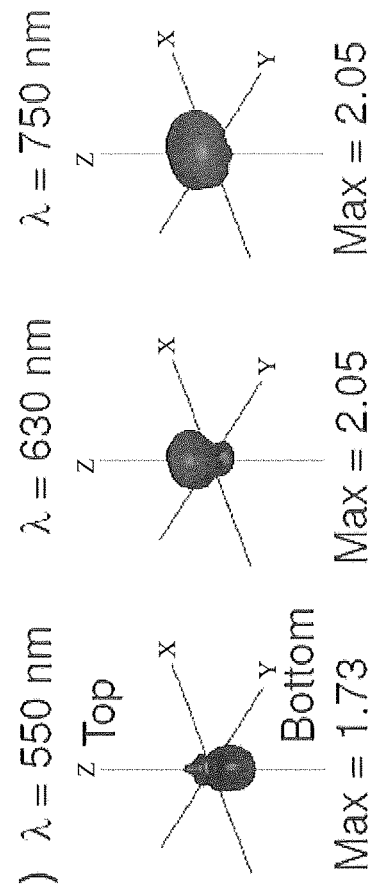
FIG. 5C
FIG. 5D
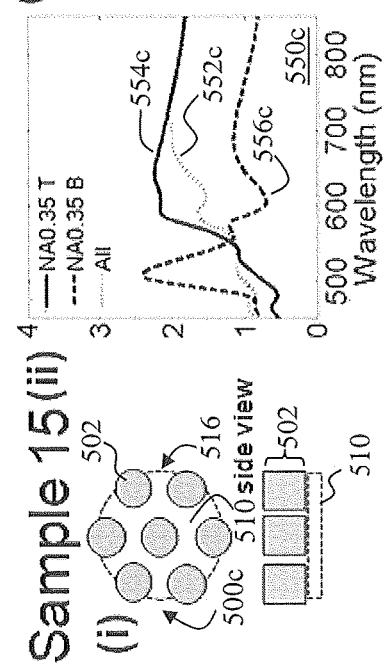
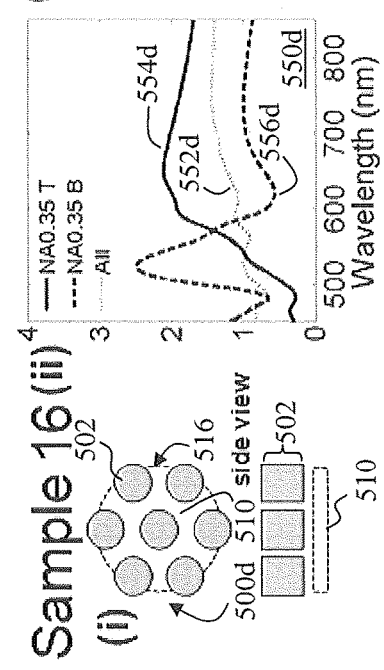

OPTICAL ANTENNA

CROSS-REFERENCE TO RELATED APPLICATION

This application claims the benefit of priority of Singapore patent application No. 10201401366R, filed 9 Apr. 2014, the content of it being hereby incorporated by reference in its entirety for all purposes.

TECHNICAL FIELD

Various embodiments relate to optical antennas.

BACKGROUND

Optical nanoantennas based on resonant plasmonic elements have been extensively studied for enhancement of luminescence of localized light sources (such as fluorophores, dyes, quantum dots etc.) in the visible and infrared (IR) spectral ranges. Optical nanoantennas, similar to their ancestors, microwave antennas, can efficiently convert propagating radiation to localized energy, and vice versa, but in the optical frequency range. Owing to the resonant nature of plasmonic elements, plasmonic antennas can create high near-field enhancement localized around the antenna and enhance the far-field luminescence of localized light sources. The main disadvantage of plasmonic nanoantennas, similar to all plasmonic-based devices, is strong losses of the plasmonic materials in the optical spectral range. Due to these losses, most of the energy tends to dissipate, heating the antennas rather than emitting it into the far-field.

Recently a concept of optical nanoantennas based on resonant dielectric nanostructures has been proposed and theoretically investigated. Similar to plasmonic elements, high-refractive index dielectric particles may possess strong resonances at optical frequencies. However, hi contrast to plasmonics, these resonances are associated only with displacement (polarization) currents with no real currents and thus no Ohmic losses involved. Thus, in transparent dielectric materials, this resonant behaviour can be practically loss-free. It has been shown theoretically that high-refractive index dielectric antennas can provide near-field enhancement and fluorescence enhancement of electric-dipole emitters comparable to plasmonic antennas. They can also significantly over-perform plasmonic antennas when an electric dipole emitter is located relatively far from the antenna surface (>50 nm) or a magnetic dipole emitter is used to excite the antenna. Performance of dielectric antenna designs for directivity and field enhancement has been verified experimentally in the GHz spectral range when all the material parameters were chosen to simulate a silicon nanoantenna at the visible and near-IR frequencies.

Until now, dielectric nanoantennas have only been designed to enhance the luminescence of point dipole sources in directions parallel to the nanoantenna plane (e.g., plane of the substrate at which the antenna can be fabricated).

SUMMARY

According to an embodiment, an optical antenna is provided. The optical antenna may include at least one first particle, and at least one second particle having a diameter that is larger than a diameter of the at least one first particle, wherein the at least one first particle and the at least one second particle are arranged along a plane, and wherein the at least one first particle is configured to enhance an optical emission of at least one light source providing an optical signal to the optical antenna and the at least one second particle is configured to direct the optical signal in a direction at least substantially perpendicular to the plane.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIGS. 4A to 4M show results and performance of optical antennas based on resonant silicon nanoparticles, according to various embodiments.

FIGS. 5A to 5E show results and performance of optical antennas based on resonant silicon nanoparticles, according to various embodiments.

DETAILED DESCRIPTION

Figure 1A:
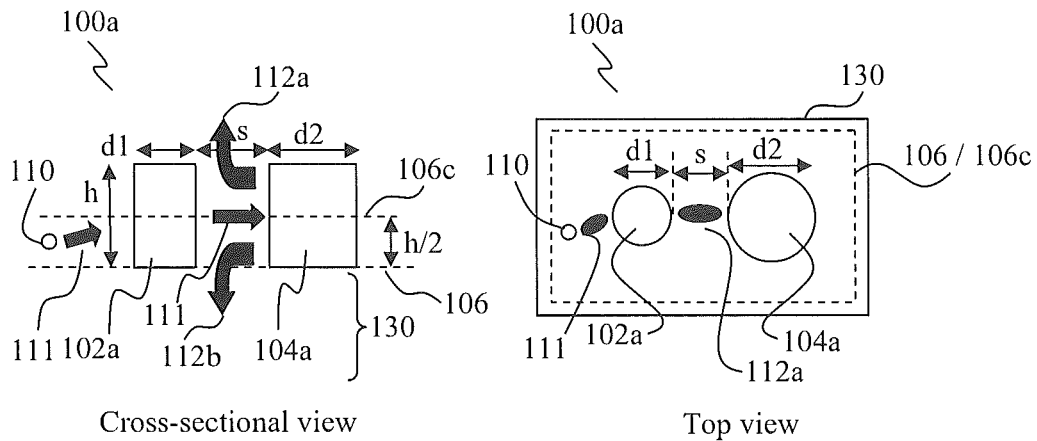
FIG. 1A shows schematic cross-sectional and top views of an optical antenna, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may relate to optical antennas (e.g., optical nanoantennas) for enhancement of luminescence of localized light sources (e.g., fluorophores, quantum dots, dyes, etc.) in a direction perpendicular to the nanoantenna plane.

Various embodiments may provide high-refractive index (e.g., ≥2) dielectric and semiconductor nanoantennas for out of plane luminescence enhancement.

Until now, dielectric nanoantennas have only been designed to enhance the luminescence of point dipole sources in directions parallel to the nanoantenna plane (e.g., plane of the substrate at which the antenna can be fabricated) or parallel to the axis connecting the dipole source with the geometrical centre of the nanoantenna. On the other hand, in many practical applications (such as bioimaging systems), it is important to enhance the fluorescence signal detected from the top or from the bottom of the nanoantenna surface. For at least the above reason, nanoantenna designs capable of significant fluorescence enhancement and boosting the fluorescence directivity perpendicular to the nanoantenna plane are required.

Consequently, various, embodiments may provide a few of such designs and a method to enhance the luminescence signal in the direction perpendicular to the device plane. Various embodiments may also enable a tuneable broadband luminescence enhancement range to be achieved.

Various embodiments may provide designs of optical antennas (e.g., nanoantennas) based on resonant high refractive index (e.g., n≥2) dielectric or semiconductor nanoparticles. The main function of the nanoantenna designs of various embodiments is enhancement of luminescence of localized light sources (e.g., fluorophores, dyes, quantum dots, etc.) surrounding the nanoparticles (which may act as nanoantennas or nanoantenna elements) in the direction perpendicular to the nanoantenna plane. The nanoantenna plane is defined as the plane at which the nanoantenna structure (defined by the nanoparticles) is fabricated, e.g., the plane of the substrate where the nanoantenna structure is located. Various embodiments may also provide a method to design nanoantennas with both high total luminescence enhancement and improved directivity of luminescence in the direction of interest (e.g., perpendicular to the nanoantenna plane).

Various embodiments may be based on the use of resonant nanoparticles of different sizes to design an optical antenna (e.g., a nanoantenna). Each nanoparticle may have electric and magnetic type Mie resonances in the range of nanoantenna operation. Smaller, particles (e.g., known as enhancers) may be introduced to obtain a high luminescence enhancement in the spectral range of interest. Larger particles (e.g., known as reflectors) may be introduced to align the luminescence direction at least substantially perpendicular to the nanoantenna plane. The smaller particles may have an enhancement range close to their magnetic dipole Mie resonance wavelength and above. For example, the smaller particles may have an enhancement range within ±25% of their magnetic dipole Mie resonance wavelength. The larger particles may have an optimal reflectance performance close to their electric dipole Mie resonance. For example, the larger particles may have an optimal reflectance performance within ±25% of their electric dipole Mie resonance.

In various embodiments, the use of nanoparticles of different sizes (e.g., at least two different sizes) may enable both high total luminescence enhancement and out-of-plane directivity to be achieved.

In various embodiments, the shape of the particles or nanoparticles may be cylindrical, cuboidal, prismatic, spherical, etc. to be more convenient for fabrication with the only condition that the particles or nanoparticles have electric and magnetic type resonances in the spectral range of interest. This may mean that the shape of the nanoparticles may be arbitrary with the only condition that the nanoparticles are resonant in the range of operation.

In various embodiments, by changing the particle size (e.g., in all directions), it may be possible to tune the spectral range of the optimized antenna performance through the visible, infra-red, terahertz and gigahertz ranges.

The nanoantenna designs may be evaluated by the luminescence enhancement in the direction perpendicular to the nanoantenna plane.

FIG. 1A shows schematic cross-sectional and top views of an optical antenna 100a, according to various embodiments. The optical antenna 100a includes at least one first particle 102a, and at least one second particle 104a having a diameter, d2, that is larger than a diameter, d1, of the at least one first particle 102a, wherein the at least one first particle 102a and the at least one second particle 104a are arranged along a plane (e.g., defined by 106 or 106c as non-limiting examples), wherein the at least one first particle 102a is configured to enhance an optical emission of at least one light source (e.g., 110) providing an optical signal (represented by the arrow 111) to the optical antenna 100a and the at least one second particle 104a is configured to direct the optical signal 111 in a direction at least substantially perpendicular to the plane 106, 106c. It should be appreciated that the drawings in FIG. 1A are not to scale.

In other words, the optical antenna 100a may include at least one first particle 102a and at least one second particle 104a. The diameter (or cross-sectional dimension), d2, of the at least one second particle 104a may be larger than the diameter (or cross-sectional dimension), d1, of the at least one first particle 102a. The at least one first particle 102a and the at least one second particle 104a may have the same height, h.

The at least one first particle 102a and the at least one second particle 104a may be arranged along a plane (or particle plane or antenna plane). In other words, the at least one first particle 102a and the at least one second particle 104a may be arranged in a direction along the plane.

The plane may be defined, for example, as the plane 106 defined at the base or end face or end surface (or tip) of the at least one first particle 102a and the at least one second particle 104a so that the at least one first particle 102a and the at least one second particle 104a may be arranged on and/or in contact with the plane. This may mean that the at least one first particle. 102a and the at least one second particle 104a may be arranged along and on the plane 106. The plane 106 may contact a bottom surface of each of the at least one first particle 102a and the at least one second particle 104a. As a non-limiting example, the plane 106 may be defined as the plane at or on which the at least one first particle 102a and the at least one second particle 104a may be formed or fabricated, e.g., the plane of the substrate (e.g., a surface of the substrate) where the at least one first particle 102a and the at least one second particle 104a may be located.

The plane may also or instead be defined as the plane 106c defined through a geometrical center of the at least one first particle 102a and the at least one second particle 104a such that the plane 106c may cut through each of the at least one first particle 102a and the at least one second particle 104a. This may mean that the at least one first particle 102a and the at least one second particle 104a may be arranged along and through a plane 106c. The plane 106c may be a central plane of the at least one first particle 102a and the at least one second particle 104a, cutting through the geometrical center of the at least one first particle 102a and the at least one second particle 104a. The plane 106c may be defined at approximately half of the height, h, of the at least one first particle 102a and the at least one second particle 104a. In other words, the plane 106c may be defined at a distance of h/2 from the base or end face or end surface (or tip) of the at least one first particle 102a and the at least one second particle 104a.

In various embodiments, at least part of the plane 106, 106c may overlap and/or may contact the at least one first particle 102a and the at least one second particle 104a.

The at least one first particle 102a may be configured to enhance an optical emission of at least one light source 110 providing an optical signal 111 to the optical antenna 100a (or to the at least one first particle 102a). The at least one light source (e.g., fluorophore molecule) 110 may be located adjacent or close or in proximity to the at least one first particle 102a, for example at a distance of less than 50 nm (i.e., <50 nm) from the at least one first particle 102a. The optical signal 111 may be provided to the at least one second particle 104a to be received by the at least one second particle 104a. The at least one second particle 104a may direct (or redirect or align) the optical signal 111 in a direction at least substantially perpendicular (or vertical) to the plane 106, 106c. The direction at least substantially perpendicular to the plane 106, 106c may mean an upwardly direction and/or a downwardly direction relative to the plane 106, 106c. This may mean that the optical signal 111 may be provided as the optical signal (represented by the arrow 112a) in an upward direction at least substantially perpendicular to the plane 106, 106c, and/or as the optical signal (represented by the arrow 112b) in a downward direction at least substantially perpendicular to the plane 106, 106c. Therefore, the optical antenna 100a may provide an out-of-plane optical signal 112a, 112b. Further, propagation of the optical signal 111 in a direction at least substantially parallel to the plane 106, 106c may be reduced or blocked.

In the context of various embodiments, the term "a direction at least substantially perpendicular to the plane" may include a direction exactly 90° to the plane and/or a direction at an angle slightly less than 90° to the plane. For example, the optical signal 111 directed by the at least one second particle 104a in a direction at least substantially perpendicular to the plane 106, 106c may occupy a space in the form of a cylinder or an inverted cone in an upward direction and/or a downward direction from (or relative to) the plane 106, 106c.

In various embodiments, the at least one second particle 104a may be configured to direct the optical signal 111 in a direction at least substantially perpendicular to the plane 106, 106c, for example, by means of reflection or scattering, so as to provide the optical signal 112a, 112b. This may mean that the at least one second particle 104a may reflect or rescatter the optical signal 111 in the direction at least substantially perpendicular to the plane 106, 106c. Therefore, the at least one second particle 104a may act as a back scatterrer or a reflector or a mirror.

In various embodiments, the at least one second particle 104a may at least substantially reduce or block propagation of the optical signal 11 in a direction parallel to the plane (e.g., in-plane propagation or emission) 100, 106c, and may rotate the emission pattern (e.g., of the enhanced optical signal 111a) towards the direction perpendicular to the plane 106, 106c.

In various embodiments, the at least one second particle 104a may also receive the optical signal 111 and may direct the optical signal 111 in the direction at least substantially perpendicular to the plane 106, 106c, e.g., by means of reflection or scattering.

In various embodiments, the at least one second particle 104a may also enhance the optical emission of the at least one light source 110 providing the optical signal 111 to the optical antenna 100a.

In various embodiments, the at least one first particle 102a and the at least one second particle 104a may be configured to cooperate to enhance the optical emission of the at least one light source 110 providing the optical signal 111 to the optical antenna 100a and direct (or align) the optical signal 111 in a direction at least substantially perpendicular to the plane 106, 106c.

In various embodiments, the at least one first particle 102a may be referred to as an enhancer or an enhancer particle. The at least one first particle 102a may be provided to provide a high optical signal (e.g., luminescence) enhancement in the spectral range of interest.

In various embodiments, the at least one second particle 104a may be referred to as a reflector or a reflector particle. The at least one second particle 104a may be provided to align the (enhanced) optical, signal direction perpendicular to the plane 106, 106c.

In various embodiments, the enhancement of the optical emission of the at least one light source 110 providing the optical signal 111, and the alignment of the optical signal 111 in the direction at least substantially perpendicular to the plane 106, 106c may be achieved within a frequency range of interest (e.g., an operational frequency range of the optical antenna 100a). For example, an optical signal enhancement range of the at least one first particle 102a and an optical signal reflection range of the at least one second particle 104a may at least substantially overlap with each other.

In the context of various embodiments, the term "enhance" may mean an increment or an improvement. In various embodiments, an enhancement factor may be calculated as total (integrated) optical signal emitted by a light source in the presence of an optical antenna (or nanoantenna), for example optical antenna 100a having the at least one first particle 102a and the at least one second particle 104a, divided by the integrated optical signal emitted by the same light source without the nanoantenna.

In the context of various embodiments, the term "diameter" as applied to the at least one first particle 102a and the at least one second particle 104a may refer to a dimension of a cross section of the at least one first particle 102a and the at least one second particle 104a defined along an axis parallel to the plane 106, 106c, or along a transverse axis perpendicular to the longitudinal axis of the at least one first particle 102a and the at least one second particle 104a.

In various embodiments, each first particle 102a and/or each second particle 104a may be cylindrical, cuboidal, prismatic, or spherical. It should be appreciated that other configurations may be possible.

In various embodiments, each first particle 102a and/or each second particle 104a may have a cross-sectional shape, defined along an axis parallel to the plane 106, 106c, or along a transverse axis perpendicular to the longitudinal axis of the at least one first particle 102a and the at least one second particle 104a, of a circle, an ellipse, a quadrilateral (e.g., a square or a rectangle) or other suitable shapes.

In the context of various embodiments, the term "diameter", as applied to a circle, may refer to the length of a straight line segment passing from side to side of the circle through the centre (or centre point) of the circle. The term "diameter", as applied to an ellipse, may refer to the length of a straight line segment passing from side to side of the ellipse through the centre (or centre point) of the ellipse and parallel to the major axis of the ellipse.

In the context of various embodiments, the term "diameter", as applied to a quadrilateral (e.g., a square or a rectangle), may refer to the length of a straight line segment passing from side to side of the quadrilateral through the centre (or centre point) of the quadrilateral. As a non-limiting example, the diameter of a quadrilateral may refer to the length of the longest straight line segment passing from side to side of the quadrilateral through the centre (or centre point) of the quadrilateral. For example, for a rectangle or a square, the diameter may refer to the length of the diagonal line passing from one corner of the rectangle or the square to an opposite corner of the rectangle or a square through the centre of the rectangle or the square.

Generally, in the context of various embodiments, the term "diameter", as applied to a shape or body, may refer to the length of a straight line segment passing from side to side of the shape or body through the centre (or centre point) of the shape or body.

In the context of various embodiments, the term "cross-sectional dimension" may mean a dimension of a cross section of the at least one first particle 102a and the at least one second particle 104a defined along an axis parallel to the plane 106, 106c, or along a transverse axis perpendicular to the longitudinal axis of the at least one first particle 102a and the at least one second particle 104a. The term "cross-sectional dimension" may include a reference to "diameter".

In the context of various embodiments, the term "axis parallel to a(the) plane" may refer to the plane itself or an axis (or a line) displaced relative, and parallel, to the plane.

Therefore, in various embodiments, a cross-sectional dimension of the at least one second particle 104a along an axis parallel to the plane 106, 106c may be larger than a cross-sectional dimension of the at least one first particle 102a along the axis.

In various embodiments, the at least one first particle 102a and the at least one second particle 104a may have the same shape.

In various embodiments, the at least one first particle 102a and the at least one second particle 104a may have at least one main axis (e.g., the longitudinal axis) oriented in the same direction. For example, the longitudinal axes of the at least one first particle 102a and the at least one second particle 104a may be aligned in a direction at least substantially perpendicular to the plane 106, 106c.

In various embodiments, the diameters (or cross-sectional dimensions), d1, d2, of the at least one first particle 102a and the at least one second particle 104a are corresponding size (or dimension) parameters.

In the context of various embodiments, one of or each of the at least one first particle 102a and the at least one second particle 104a may have a diameter or a cross-sectional dimension in a range from the nanometer (nm) range, through the micrometer (μm) range, to the millimeter (mm) range. By changing, or varying the diameter or cross-sectional dimension (or size) of the at least one first particle 102a and/or the at least one second particle 104a, the operational range of the optical antenna 100a may be tuned from the visible spectral range to the near-infrared (near-IR) spectral range, and further to the infrared (IR) spectral range and the microwave spectral range.

In various embodiments, each of the at least one first particle 102a and the at least one second particle 104a may be made of a material having a refractive index, n, of at least two (e.g., ≥2), for example, ≥2.5, ≥3, ≥3.5, or any higher number.

In various embodiments, the material of the at least one first particle 102a and/or the at least one second particle 104a may be a dielectric material or a semiconductor material.

In the context of various embodiments, the dielectric material may include, but not limited to titanium dioxide ($TiO_2$), zinc oxide (ZnO). These example materials are generally named as dielectrics although they are widebandap semiconductor.

In the context of various embodiments, the semiconductor material may include, but not limited to silicon (Si), silicon nitride (SiN), germanium (Ge), other group IV semiconductors, III-V semiconductors (e.g., gallium phosphide (GaP), gallium nitride (GaN), gallium arsenide (GaAs), indium phosphide (InP), etc.), different alloys and combinations of these materials with refractive index≥2.

In the context of various embodiments, each of the at least one first particle 102a and the at least one second particle 104a may be a passive particle, having a passive material. In other words, each of the at least one first particle 102a and the at least one second particle 104a may be non-active or may not include a gain material.

In various embodiments, each of the at least one first particle 102a and the at least one second particle 104a may be adapted to exhibit electric and magnetic Mie resonances in the operational range (e.g., operational frequency range) of the optical antenna 100a. For example, each of the at least one first particle 102a and the at least one second particle 104a may have respective predetermined cross-sectional dimensions adapted to exhibit electric and magnetic Mie resonances in the operational range.

In various embodiments, each of the at least one first particle 102a and the at least one second particle 104a may include a nanoparticle. The term "nanoparticle" may mean a particle having at least one dimension (e.g., diameter) in the nanometer range, for example, between about 10 nm and about 500 nm.

In various embodiments, the nanoparticle of the at least one first particle 102a may have a diameter (or cross-sectional dimension), d1, around or about 120 nm (e.g., 120 nm±40 nm), for example, between about 80 nm and about 160 nm, between about 100 nm and about 140 nm or between about 80 nm and about 140 nm. However, it should be appreciated that a smaller diameter may also be provided. In various embodiments, the nanoparticle of the at least one first particle 102a may be made of silicon, has a cylindrical shape, a height of about 150 nm±50 nm (e.g., between about 100 nm and about 200 nm, e.g., about 150 nm) and a diameter of about 120 nm±40 nm (e.g., between about 80 nm and about 160 nm, e.g., about 120 nm), which are optimized to have high luminescence enhancement for wavelengths from about 550 nm to about 800 nm.

In various embodiments, the nanoparticle of the at least one second particle 104a may have a diameter (or cross-sectional dimension), d2, about or around 160 nm (e.g., 160 nm±40 nm), for example, between about 120 nm and about 200 nm, between about 140 nm to about 180 nm, or about 140 nm to about 200 nm. However, it should be appreciated that a larger diameter may also be provided. In various embodiments, the nanoparticle of the at least one second particle 104a may be made of silicon, has a cylindrical shape, a height of about 150 nm±50 nm (e.g., between about 100 nm and about 200 nm, e.g., about 150 nm) and a diameter of about 160 nm±40 nm (e.g., between about 120 nm and about 200 nm, e.g., about 160 nm), which are optimized to have high out-of-plane directivity for wavelengths from about 550 nm to about 800 nm.

It should be appreciated that the sizes or diameters that may be provided for the at least one first particle 102a and the at least one second particle 104a may be dependent on the material of the at least one first particle 102a and the at least one second particle 104a. In various embodiments, the sizes or diameters that may be provided for the at least one first particle 102a and the at least one second particle 104a may be applicable for a particular spectral range of emission, which is also dependent on a particular particle shape (e.g. cylinder, sphere, cuboid, etc.). For different spectral ranges and/or materials and/or particle shapes, the sizes may be different.

In various embodiments, the at least one first particle and the at least one second particle may be arranged in contact with each other.

In various embodiments, the at least one first particle 102a and the at least one second particle 104a may be arranged spaced apart (or separated) from each other.

In various embodiments, a side-to-side separation (or side-to-side spacing or distance), s, between the at least one first particle 102a and the at least one second particle 104a may be in a range of between about 10 and about 100 nm, for example, between about 10 and about 50 nm, between about 10 and about 30 nm, between about 50 and about 100 nm, or between about 30 and about 50 nm. In the context of various embodiments, the term "side-to-side separation" may mean the shortest (or minimum) separation or spacing between the at least one first particle 102a and the at least one second particle 104a.

In various embodiments, the optical antenna 100a may further include a plurality of second particles 104a arranged along the plane 106, 106c and at least substantially surrounding the at least one first particle 102a, wherein each second particle has a diameter (or cross-sectional dimension), d2, that is larger than the diameter (or cross-sectional dimension), d1, of the at least one first particle 102a. The plurality of second particles 104a and the at least one first particle 102a may be arranged in a square lattice, a hexagonal lattice or randomly.

In various embodiments, the optical antenna 100a may further include a plurality of first particles 102a, and a plurality of second particles 104a at least substantially surrounding the plurality of first particles 102a, the plurality of first particles 102a and the plurality of second particles 104a being arranged along the plane 106, 106c, wherein each second particle 104a has a diameter (or cross-sectional dimension), d2, that is larger than a diameter (or cross-sectional dimension), d1, of each first particle 102a. The plurality of first particles 102a and/or the plurality of second particles 104a may be arranged in a square lattice, a hexagonal lattice, circular structures or, other lattice structures or randomly.

In various embodiments, the optical antenna 100a may further include a plurality of first particles 102a, and a plurality of second particles 104a arranged interposed among the plurality of first particles 102a, the plurality of first particles 102a and the plurality of second particles 104a being arranged along the plane 106, 106c, wherein each second particle 104a has a diameter (or cross-sectional dimension), d2, that is larger than a diameter (or cross-sectional dimension), d1, of each first particle 102a. The plurality of first particles 102a and/or the plurality of second particles 104a may be arranged in a square lattice, a hexagonal lattice circular structures or, other lattice structures or randomly.

In various embodiments, the optical antenna 100a may further include a plurality of first particles 102a and a plurality of second particles 104a arranged alternately along the plane 106, 106c, wherein each second particle 104a has a diameter (or cross-sectional dimension), d2, that is larger than a diameter (or cross-sectional dimension), d1, of each first particle 102a. The plurality of first particles 102a and/or the plurality of second particles 104a may be arranged in a square lattice, a hexagonal lattice circular structures or, other lattice structures or randomly.

In the context of various embodiments, the plurality of first particles 102a may be spaced apart from one another.

In the context of various embodiments, the plurality of second particles 104a may be spaced apart from one another.

In the context of various embodiments, the plurality of first particles 102a may be configured to enhance the optical emission of the at least one light source 110 providing an optical signal 111 to the optical antenna 100a (or to the plurality of first particles 102a).

In the context of various embodiments, the plurality of second particles 104a may be configured to direct (or align) the optical signal 111 in the direction at least substantially perpendicular (or vertical) to the plane 106, 106c. In this way, the optical signal 112a and/or the optical signal 112b may be provided.

In the context of various embodiments, a side-to-side separation (or spacing) between adjacent first particles 102a of the plurality of first particles 102a may be in a range of between about 10 nm and about 100 nm, for example, between about 10 nm and about 50 nm, between about 50 nm and about 100 nm, or between about 50 nm and about 80 nm. Adjacent first particles 102a may be in contact with each other.

In the context of various embodiments, a side-to-side separation (or spacing) between adjacent second particles 104a of the plurality of second particles 104a may be in a range of between about 10 nm and about 100 nm, for example, between about 10 nm and about 50 nm, between about 50 nm and about 100 nm, or between about 50 nm and about 80 nm. Adjacent second particles 104a may be in contact with each other.

In various embodiments, the optical antenna 100a may further include the at least one light source 110 configured to provide the optical signal 111. The at least one light source may be arranged adjacent to the at least one first particle 102a. The at least one light source may be arranged adjacent to or interposed with the at least one first particle 102a and the at least one second particle 104a. The at least one light source may be arranged along the plane 106, 106c.

In various embodiments, the optical antenna 100a may further include a plurality of light sources configured to provide the optical signal 111. At least some of the plurality of light sources may be arranged along the plane 106, 106c.

The plurality of light sources may at least substantially surround the at least one first particle 102a and the at least one second particle 104a.

In various embodiments, the plurality of light sources may occupy a space (e.g., a cylindrical space) or a volume (e.g., a cylindrical volume) at least substantially surrounding the at least one first particle 102a and the at least one second particle 104a. A diameter of the space or the volume may be between about 250 nm and about 400 nm, for example, between about 250 nm and about 350 nm, between about 250 nm and about 300 nm, or between about 300 nm and about 400 nm. A height of the space or the volume may be about 150 nm, or may be at least substantially the same as the height, h, of the at least one first particle 102a and/or the at least one second particle 104a. The plurality of light sources may also be distributed on top of a substrate 130 around the optical antenna 100a and away from it to form a layer with a certain thickness lower, around or larger than the thickness of at least one first particle 102a and at least one second particle 104a.

In various embodiments, the at least one light source 110 or each light source may include at least one of a fluorophore, a quantum dot or a dye.

In various embodiments, the optical antenna 100a may further include a substrate 130 on which the at least one first particle 102a and the at least one second particle 104a may be formed or fabricated on. The surface of the substrate 130 on which the at least one first particle 102a and the at least one second particle 104a may be formed may define the plane 106. The at least one light source 110 or each light source may be formed on top of the substrate 130. The substrate 130 may be a transparent substrate, for example, a glass, quartz, fused silica, or sapphire.

In the context of various embodiments, the optical emission of the at least one light source 110 may mean an optical emission characteristic (e.g., an optical emission intensity) of the at least one light source 110.

In the context of various embodiments, the optical emission of the at least one light source 110 may include an emission rate of the at least one light source 110 or an intensity of the optical emission (e.g., amount of emission events per second) of the at least one light source 110. For example, the at least one first particle 102a may enhance the emission rate of the light source 110. In various embodiments, the optical antenna 110a or the at least one first particle 102a may enhance emission of the at least one light source 110 (e.g., one or more small emitters) to enable the at least one light source 110 to emit more efficiently (e.g, by increasing intensity of emission of the least one light source 110).

In the context of various embodiments, the enhancement of optical emission (or emission enhancement) of a light source (e.g., the at least one light source 110, or a small emitter) in the presence of a nanoresonator/nanoantenna (e.g., the at least one first particle 102a of the optical antenna 100a) is a result of a so-called Purcell effect. This phenomenon states that the emission rate of a light source (e.g., an emitter) may depend on the environment surrounding the emitter, in particular it may be strongly modified if the emitter is placed inside a resonator or in proximity of a nanoresonator. This effect forms fundamentals of nanoantennas or optical antennas. The phenomenon may be explained in the following manners, for example, (1) In quantum language: The resonator (e.g., particle) placed around the light source (e.g., emitter) may change the local density of optical states and may provide additional channels for excitation relaxation from the excited state. This may change the probability/rate of relaxation and thus may change emission intensity (amount of emission events per second); (2) In classical language: The particle or nanoresonator may reflect or scatter the emitted field and may concentrate it back in the position of the light source (e.g., emitter). The scattered/reflected field in the position of the emitter may enhance (or suppress) its emission accordingly.

Figure 1B:
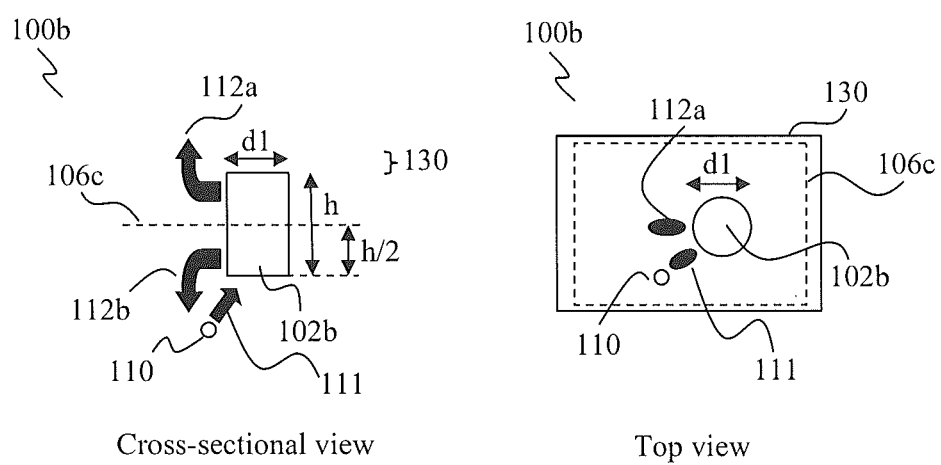
FIG. 1B shows schematic cross-sectional and top views of an optical antenna, according to various embodiments.

FIG. 1B shows schematic cross-sectional and top views of an optical antenna 100b, according to various embodiments. The optical antenna 100b includes at least one particle 102b, and at least one light source 110 configured to provide an optical signal 111 to the at least one particle 102b, wherein the at least one light source 110 is arranged displaced by a distance equal to or more than half of a height of the at least one particle 102b in a first direction at least substantially perpendicular to a plane 106c defined through a geometrical center of the at least one particle 102b, and wherein the at least one particle 102b is configured to enhance an optical emission of at least one light source 110 and further configured to direct the optical signal 111 in at least one of the first direction or a second direction opposite to the first direction. The plane 106c may be defined through a geometrical center of the optical antenna 100b. It should be appreciated that the drawings in FIG. 1B are not to scale.

In other words, the optical antenna 100b may include at least one particle 102b and at least one light source 110, where the at least one particle 102b may receive an optical signal (e.g., light) 111 provided by the at least one light source 110. The at least one particle 102b may have a diameter (or cross-sectional dimension), d1, and a height, h. The plane 106c defined through a geometrical center of the at least one particle 102b may be a central plane, and may cut through the at least one particle 102b at the geometrical center. The plane 106c may be defined at approximately half of the height, h, of the at least one particle 102b. In other words, the plane 106c may be defined at a distance of h/2 from the base or end face or end surface (or tip) of the at least one particle 102b.

The at least one particle 102b may enhance the optical emission of the at least one light source 110. The optical signal 111 generated by the at least one light source 110 may be directed (or aligned) (represented by the arrow 112a) in an upward direction (e.g., second direction) at least substantially perpendicular (or vertical) to the plane 106c, and/or may be directed (or aligned) (represented by the arrow 112b) in a downward direction (e.g., first direction) at least substantially perpendicular (or vertical) to the plane 106c. Therefore, the optical antenna 100b may provide an out-of-plane optical signal 112a, 112b. Further, propagation of the optical signal 111 in a direction at least substantially parallel to the plane 106c may be reduced or blocked.

The at least one light source 110 may be arranged at a distance of at least h/2 in the first direction relative to the plane 106c. This may mean that the at least one light source 110 may be arranged below or on top of the at least one particle 102b. In other words, the at least one light source 110 may be arranged at or displaced, in the first direction, relative to a plane that is parallel to the plane 106c and located at the base or end face or end surface (or tip) of the at least one particle 102b.

In various embodiments, the at least one light source 110 may be arranged overlapping with the at least one particle 102b in the first direction. The at least one light source 110 and the at least one particle 102b may be arranged coaxially in the first direction.

In various embodiments, the at least one light source 110 may include at least one of a fluorophore, a quantum dot or a dye.

In various embodiments, the at least one particle 102*b* may include a nanoparticle.

In various embodiments, the at least one particle 102*b* may be made of a material having a refractive index, n, of at least two (e.g., ≥2), for example, ≥2.5, ≥3, ≥3.5, or any higher number.

In various embodiments, the material of the at least one particle 102*b* may be a dielectric material or a semiconductor material.

In various embodiments, the optical antenna 100*b* may further include a plurality of particles 102*b* arranged along the plane 106*c*. The plurality of particles 102*b* may be configured to enhance the optical emission of the at least one light source 110 and further configured to direct the optical signal (e.g., light) 111 in at least one of the first direction or the second direction. The plane 106*c* may be defined through a geometrical center of the plurality of particles 102*b* or a geometrical center of the optical antenna 100*b*. The plurality of particles 102*b* may be spaced apart from one another. In some embodiments, the plurality of particles 102*b* may be arranged in contact with each other. The plurality of particles 102*b* may be arranged in a square lattice or a hexagonal lattice, a circular structure, other latice structures or randomly.

In various embodiments, the optical antenna 100*b* may further include a plurality of additional particles (e.g., 104*a*, FIG. 1A) at least substantially surrounding the plurality of particles 102*b*, the plurality of particles 102*b* and the plurality of additional particles being arranged along the plane 106*c*, wherein each additional particle of the plurality of additional particles has a diameter (or cross-sectional dimension) that is larger than a diameter (or cross-sectional dimension), d1, of each particle 102*b* of the plurality of particles 102*b*. The plurality of additional particles may be configured to direct (or align) the optical signal 111 in at least one of the first direction or the second direction. The plane 106*c* may be defined through a geometrical center of the plurality of particles 102*b* and the plurality of additional particles. The plurality of additional particles may be spaced apart from one another. The plurality of particles 102*b* and/or the plurality of additional particles may be arranged in a square lattice or a hexagonal lattice, a circular structure, other latice structures or randomly.

In various embodiments, each particle 102*b* and each additional particle may have the same shape and/or the same height.

In various embodiments, the optical antenna 100*b* may further include a plurality of light sources 110 arranged displaced by a distance equal to or more than half of the height of the at least one particle 102*b* in the first direction. All of the plurality of light sources 110 may be arranged displaced relative to the plane 106*c* by a distance equal to or more than half of the height of the at least one particle 102*b* in the first direction. The plurality of light sources 110 may provide the optical signal 111 to the at least one particle 102*b*.

In various embodiments, the at least one particle 102*b* or each particle 102*b* may have a height, h, of about 150 nm. The plane 106*c* may be defined at a height of about 75 nm of the particle 102*b*. The at least one light source 110 or the plurality of light sources 110 may be arranged displaced by about 75 nm to about 150 nm relative to the plane 106*c* in the first direction.

In various embodiments, the optical antenna 100*b* may further include a substrate 130 on which the at least one particle 102*b* may be formed. The at least one light source 110 may be provided on a side of the at least one particle 102*b* opposite to that where the substrate 130 on which the at least one particle 102*b* may be formed. The substrate 130 may be a transparent substrate, for example, a glass, quartz, fused silica, or sapphire.

It should be appreciated that descriptions in the context of the optical antenna 100*a* of FIG. 1A, for example, in terms of definition, and/or materials, and/or parameters, and/or sizes, and/or arrangements, may be applicable to the optical antenna 100*b* of FIG. 1B.

It should be appreciated that descriptions in the context of the optical antenna 100*a* may correspondingly be applicable in relation to the optical antenna 100*b*, and vice versa.

It should be appreciated that descriptions in the context of the optical antennas 100*a*, 100*b* may correspondingly be applicable in relation to methods for forming the respective optical antennas 100*a*, 100*b*.

Figure 2:
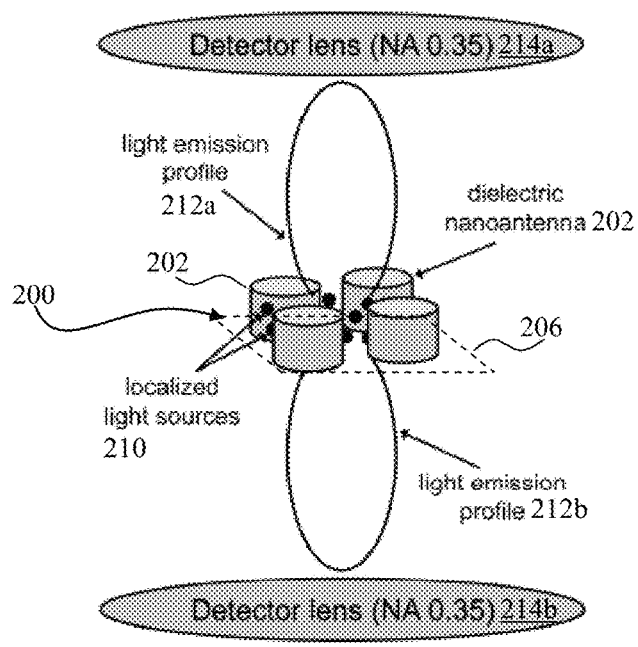
FIG. 2 shows a schematic representation of an optical antenna, according to various embodiments.

FIG. 2 shows a schematic representation of an optical antenna (e.g., nanoantenna, or nanoantenna device) 200, according to various embodiments, illustrating luminescence enhancement, for example as a result of enhancement of an optical emission of one or more light sources. The optical antenna 200 may enhance the luminescence signal of localized light sources (represented as 210 for two such localized light sources) in the direction perpendicular to its plane (represented by the dashed box 206). The optical antenna (nanoantenna) 200 may include a plurality of nanoparticles (represented as 202 for two such nanoparticles), for example, dielectric nanoparticles which may act as dielectric nanoantennas. The plane 206 of the nanoparticles 202, and overall of the nanoantenna 200, may be defined as the plane at which the nanoparticles 202 or the nanoantenna structure 200 is fabricated, e.g., the plane of the substrate (not shown) where the nanoparticles 202 or the nanoantenna structure 200 is located.

In various embodiments, the localized light sources 210 may be located-around the nanoparticles 202 composing the nanoantenna structure 200. The localized light sources 210 may be located in between adjacent nanoparticles 202.

The nanoparticles 202, and overall the nanoantenna 200, may both enhance the total luminescence of the light sources 210 due to the change of their local density of photonic states and tailor the directivity of the emission towards the directions perpendicular to the nanoantenna plane 206, for example, emission in an upward direction as represented by the light emission profile 212*a* to be received by a detector lens 214*a*, and/or emission in a downward direction as represented by the light emission profile 212*b* to be received by a detector lens 214*b*. Each of the detector lens 214*a*, 214*b* may have a numerical aperture (NA) between 0 and 1.46, for example about 0.35.

Figure 3:
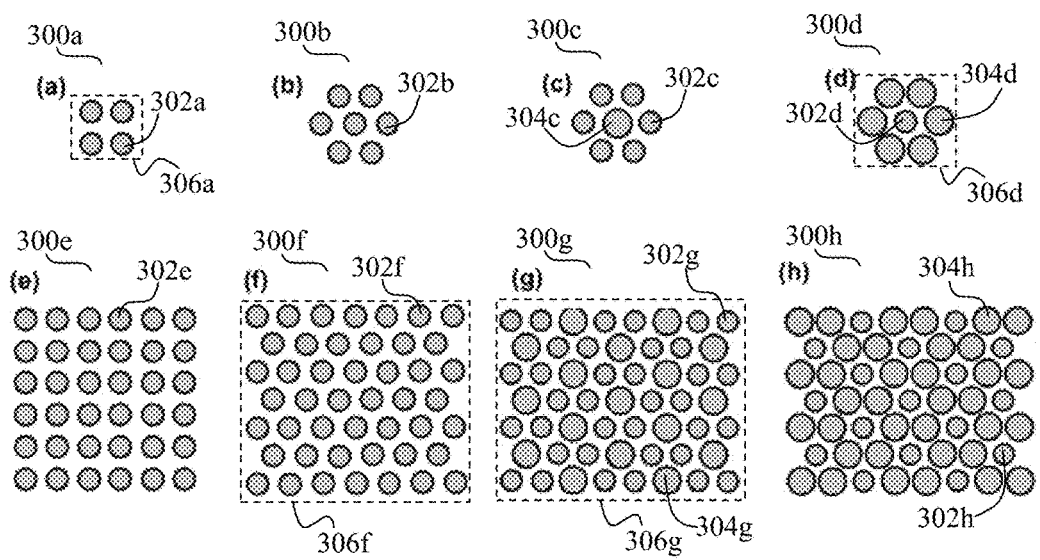
FIGS. 3(a) to 3(h) show schematic top views of optical antennas, according to various embodiments.

FIGS. 3(*a*) to 3(*h*) show schematic top views of optical antennas (or nanoantennas) 300*a*, 300*b*, 300*c*, 300*d*, 300*e*, 300*f*, 300*g*, 300*h*, according to various embodiments, illustrating non-limiting examples of nanoantenna structures with designs of high refractive index (e.g., ≥2) dielectric or semiconductor nanoparticles, acting as nanoantennas, for enhancement of luminescence in a direction perpendicular to the nanoantenna plane.

In various embodiments, a nanoantenna or an optical antenna may include or may be composed of one, a few or multiple nanoparticles (e.g., resonant nanoparticles). For illustration purposes, the optical antennas 300*a*-300*h* are illustrated in FIGS. 3(*a*)-3(*h*) having a plurality of nanoparticles. For example, the optical antennas 300a, 300b, 300e, 300f may include a plurality of nanoparticles 302a, 302b, 302e, 302f of the same size or dimension (e.g., cross-sectional dimension or diameter). The optical antennas 300c, 300d, 300g, 300h may include a plurality of nanoparticles of different sizes or dimensions (e.g., different cross-sectional dimensions or different diameters), for example, a plurality of first nanoparticles 302c, 302d, 302g, 302h, and a plurality of second nanoparticles 304c, 304d, 304g, 304h having a cross-sectional dimension or diameter that is larger than that of the plurality of first nanoparticles 302c, 302d, 302g, 302h.

In various embodiments, each nanoparticle 302a, 302b, 302c, 302d, 302e, 302f, 302g, 302h, 304c, 304d, 304g, 304h may include or may be made of a dielectric material or a semiconductor material, where the dielectric material or semiconductor material may have a refractive index, n, of at least two (e.g., n≥2). The dielectric material or the semiconductor material may have lower losses as compared to, for example, plasmonic elements. Lower losses of the dielectric or semiconductor material in the spectral range of interest may assure better optical antenna (nanoantenna) performance.

The nanoparticles may be arranged in a square lattice (FIGS. 3(a), 3(e)) or a hexagonal lattice (FIGS. 3(b), 3(c), 3(d), 3(f), 3(g), 3(h)), and/or in any other ordered or disordered manner or arrangement.

The optical antenna 300c may include a plurality of first nanoparticles 302c arranged in a hexagonal lattice, with a larger (diameter) second nanoparticle 304c at the centre of the hexagonal lattice. The plurality of first nanoparticles 302c may at least substantially surround or entirely surround the larger second nanoparticle 304c.

The optical antenna 300d may include a plurality of second nanoparticles 304d arranged in a hexagonal lattice, with a smaller (diameter) first nanoparticle 302d at the centre of the hexagonal lattice. The plurality of second nanoparticles 304d may at least substantially surround or entirely surround the smaller first nanoparticle 302d. In various embodiments, a plurality of first nanoparticles 302d may be provided, with a plurality of second nanoparticles 304d at least substantially surrounding or entirely surrounding the plurality of first nanoparticles 302d, similar to the optical antenna 400g (FIG. 4G) to be described later.

The optical antenna 300g may include a hexagonal array of unit cells, each unit cell having a plurality of first nanoparticles 302g with a larger (diameter) second nanoparticle 304g at the centre of a hexagonal lattice similar to the arrangement for the optical antenna 300c. In the optical antenna 300g, at least some of the plurality of second nanoparticles 304g may be arranged interposed among the plurality of first nanoparticles 302g, or vice versa. At least some of the plurality of first nanoparticles 302g and at least some of the plurality of second nanoparticles 304g may be arranged alternately.

The optical antenna 300h may include a hexagonal array of unit cells, each unit cell having a plurality of second nanoparticles 304h with a smaller (diameter) first nanoparticle 302h at the centre of the hexagonal lattice similar to the arrangement for the optical antenna 300d. In the optical antenna 300h, at least some of the plurality of second nanoparticles 304h may be arranged interposed among the plurality of first nanoparticles 302h, or vice versa. At least some of the plurality of first nanoparticles 302h and at least some of the plurality of second nanoparticles 304h may be arranged alternately.

In various embodiments, the shape or configuration of any one or each of the nanoparticles 302a, 302b, 302c, 302d, 302e, 302f, 302g, 302h, 304c, 304d, 304g, 304h may be, but not limited to, cylindrical, cuboidal, prismatic, spherical. However, it should be appreciated that any one or each of the nanoparticles 302a-302h, 304c, 304d, 304g, 304h may have any suitable shape, for example depending on design requirements, with the (only) condition that each nanoparticle 302a-302h, 304c, 304d, 304g, 304h has electric and magnetic Mie resonances in the spectral range of interest.

In various embodiments, any one of each of the nanoparticles 302a, 302b, 302c, 302d, 302e, 302f, 302g, 302h, 304c, 304d, 304g, 304h may have a cross-sectional shape of a circle, a square, a rectangle or a triangle, or any other suitable polygonal shape.

The main function of the optical antenna (or nanoantenna or nanoparticle) designs is to enhance luminescence (or in some examples, fluorescence) of localized light sources (e.g., fluorophores, dyes, quantum dots, etc.) surrounding the nanoparticles, acting as nanoantennas, in the direction perpendicular to the nanoantenna plane, e.g., as illustratively represented by the dashed boxes 306a, 306d, 306f, 306g for some of the optical antennas. Luminescence (or in some examples, fluorescence) of the localized light sources may be enhanced as a result of enhancement of an optical emission of the localized light sources.

In various embodiments, some of the optical antenna (or nanoantenna) designs may be composed of nanoparticles with different sizes (e.g., 300c, 300d, 300g, 300h). Use of designs with nanoparticles of different sizes may help to provide high luminescence enhancement by the antenna or optical antenna (e.g., enabled by smaller particles, e.g., plurality of first nanoparticles 302c, 302d, 302g, 302h) and to align the antenna emission pattern towards or in the direction perpendicular to the nanoantenna plane, e.g., 306d, 306g (e.g., enabled by larger particles, e.g., plurality of second nanoparticles 304c, 304d, 304g, 304h). In various embodiments, the use of nanoparticles of different sizes (e.g., at least two different sizes) may enable both high total luminescence enhancement and out-of-plane directivity to be achieved.

In various embodiments, two or more different sizes of nanoparticles for or inside an (single) optical antenna may be provided or used to provide broadband enhancement in the spectral range of interest. The spectral range may be tuned through the visible or infrared (IR) spectrum by scaling or varying the nanoparticle sizes.

Final-difference time domain simulations (FDTD, Lumerical Solutions) may be employed to demonstrate the performance of some of the optical antenna (nanoantenna) designs, as will be described below.

As non-limiting examples, silicon (Si) has been chosen as a material of the nanoparticles comprising or defining the nanoantenna structures. Silicon is a good material of choice for the visible and near-IR spectral ranges of operation since silicon has a relatively high refractive index (e.g., n>3.5) and low losses through the visible and near-IR spectral range (e.g., wavelength, λ, above 500 nm).

The localized light sources may be modelled as point electric dipoles randomly oriented and distributed around the nanoparticles. Each dipole may emit independently of the others, providing a far-field emission diagram due to its interaction with the antenna or the nanoparticles of the optical antenna. Each dipole may emit an optical signal (e.g., luminescence or fluorescence). The total emission diagram may be calculated as a sum of the emission diagrams of all single dipoles. The number of dipoles in the simulations is taken to be 50 dipoles to accumulate a statistical distribution.

Results and performance of optical antennas (or nanoantennas) based on resonant silicon nanoparticles (e.g., in the form of cylinders) may be as shown in FIGS. 4A to 4M. The far-field diagrams presented in FIGS. 4A to 4M, relating to the three diagrams at three different wavelengths, λ, indicated as diagrams (iii) in each of the FIGS. 4A to 4M, are normalized to the far-field diagram of 50 independently emitting, randomly distributed and oriented dipoles (or emitters) located in the same area but without the nanoparticles or the optical antenna (nanoantenna).

The model may simulate measurement situations when nanoparticles, acting as nanoantennas, are surrounded by randomly distributed emitters (or dipoles), which may emit in different directions and/or at different time moments. In the simulations, the minimal distance between a particle surface and a dipole may be limited by about 10 nm. This may account for effects of silicon oxidation or an additional protective layer on top of the nanoparticle or the antenna. The optical antenna or the nanoparticles thereof may be surrounded by a homogeneous medium with a refractive index of about 1.4. This may account for a nanoantenna on a low-refractive index substrate (n=1.4–1.6) covered by a liquid or solid medium, which may be provided during measurements of a fabricated optical antenna.

As will be described below, together with the far-field emission patterns, an enhancement factor of the nanoantennas or the nanoparticles may be provided, which may be defined for different solid angles as a total power emitted by 50 independent randomly oriented and distributed around the nanoantenna dipoles into a solid angle of interest, normalized to the emission power of the same amount of dipoles randomly distributed inside the same area but without the nanoantenna or the nanoparticles. Comparison may be carried out of the enhancement factors of the nanoantennas or the nanoparticles calculated for different wavelengths of emission into two different solid angles: first—corresponding to a microscope objective with a numerical aperture of about 0.35 located on the top side and the bottom side of the nanoantenna plane (see FIG. 2); second—corresponding to the integrated emission in all directions. All simulated nanoantennas are composed of silicon nanocylinders with the same height of about 150 nm and with varied diameters and arrangements (see Table 1 below for more details of the nanoparticle or nanoantenna parameters for each sample). In various embodiments, these nanoantenna designs may be fabricated by standard nanofabrication processes such as photolithography, e-beam lithography, nanoimprint lithography, etc.

FIGS. 4A to 4M show results and performance of optical antennas, 400a, 400b, . . . , 400m, based on resonant silicon nanoparticles (e.g., in the form of cylinders), according to various embodiments. Diagrams indicated as (i) in FIGS. 4A to 4M show schematic top views of the different simulated nanoantenna structures. The area filled with randomly distributed dipoles 410 is marked by a dashed circle 416.

Diagrams indicated as (ii) in FIGS. 4A to 4M show plots 450a, 450b, . . . , 450m, of enhancement factor provided by the nanoparticles (e.g., 402, 404) or the nanoantennas 400a, 400b, . . . , 400m calculated as a ratio of the emission signal into a particular solid angle by 50 randomly distributed and oriented dipoles with antenna and without it. The diagrams illustrate the spectral dependence of the nanoantenna enhancement factor calculated in all directions (dotted lines 452a, 452b, . . . , 452m) and into a solid angle corresponding to a microscope objective with about 0.35 NA, from the top (solid lines 454a, 454b, . . . , 454m) of the nanoantenna 400a, 400b, . . . , 400m, or the nanoantenna plane, and from the bottom (dashed lines 456a, 456b, . . . , 456m) of the nanoantenna 400a, 400b, . . . , 400m, or the nanoantenna plane (see FIG. 2). In other words, results 452a, 452b, . . . , 452m correspond to the total emission, results 454a, 454b, . . . , 454m correspond to the emission perpendicular to, and in an upward direction from the nanoantenna 400a, 400b, . . . , 400m, or from the nanoantenna plane, and results 456a, 456b, . . . , 456m correspond to the emission perpendicular to, and in a downward direction from the nanoantenna 400a, 400b, . . . , 400m, or from the nanoantenna plane.

Diagrams indicated as (iii) in FIGS. 4A to 4M show (three-dimensional, 3D) far-field emission diagrams of the nanoparticles (e.g., 402, 404) or the nanoantennas 400a, 400b, . . . , 400m, excited by 50 randomly distributed and oriented electric dipoles 410 at three different wavelengths of emission specified in each of FIGS. 4A to 4M. The dipoles or emitters 410 may be distributed in a cylindrical area 416 with a diameter ranging from about 250 nm to about 400 nm (see Table 1) and a height of about 150 nm around the geometrical center of the nanoantennas 400a, 400b, . . . , 400m. The area 416 with dipoles 410 is chosen as a non-limiting example to demonstrate the nanoantenna performance and may be different in different situations. The maximum value of emission shown in diagrams (iii) in FIGS. 4A to 4M is normalized to the maximum value of the far-field emission of 50 point dipoles randomly distributed in the same cylindrical area (e.g., 416) with no antenna inside.

TABLE 1

Parameters of the simulated samples.

| Sample # | Particle diameter (nm) | Particle height (nm) | Minimum side-to side separation (nm) | Lattice type | Single element/ Array | Diameter of area with dipoles (nm) |
| --- | --- | --- | --- | --- | --- | --- |
| 1 | 120 | 150 | 50 | squared | single | 300 |
| 2 | 170 | 150 | 50 | squared | single | 400 |
| 3 | 120 | 150 | 30 | squared | single | 250 |
| 4 | 120 | 150 | 50 | hexagonal | single | 400 |
| 5 | 120/160 | 150 | 50/30 | hexagonal | single | 400 |
| 6 | 160/120 | 150 | 30/50 | hexagonal | single | 400 |
| 7 | 160/120 | 150 | 10/50 | hexagonal | single | 400 |
| 8 | 120 | 150 | 50 | hexagonal | array | 400 |
| 9 | 120/160 | 150 | 50/30 | hexagonal | array | 400 |
| 10 | 160/120 | 150 | 30/50 | hexagonal | array | 400 |
| 11 | 160 | 150 | 30 | hexagonal | array | 400 |

In the first 4 examples, Samples 1-4, the dependence of the antenna performance on the main antenna parameter such as the size of the nanoparticles and the distance between them may be demonstrated.

Sample 1 (FIG. 4A) is composed of or includes 4 nanoparticles with similar sizes (diameter), as represented by 402 for one such nanoparticle (see also, for example, FIG. 3A). Each nanoparticle 402 may be a cylinder with a height of about 150 nm and a diameter of about 120 nm. The side-to-side separation between the neighboring or adjacent cylinders 402 may be about 50 nm (see Table 1). The four nanoparticles 402 are arranged in a square lattice or arrangement. The four nanoparticles 402 may be configured as a single element (unit cell) defining the optical antenna 400a. The diameter of the cylindrical area 416 with dipoles 410 is about 300 nm.

Figure 4A:
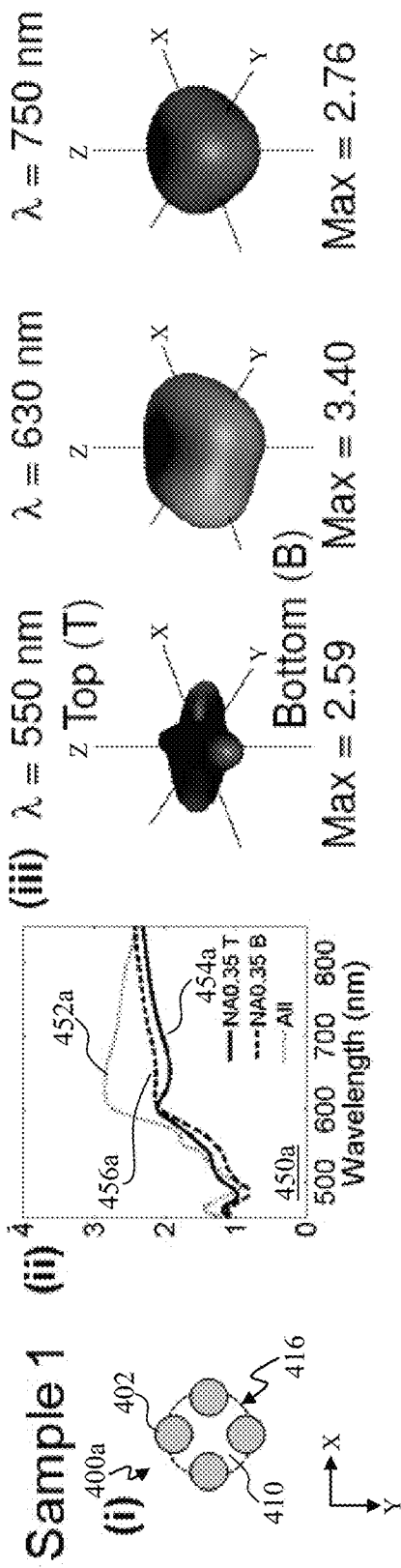
Figure 4B:
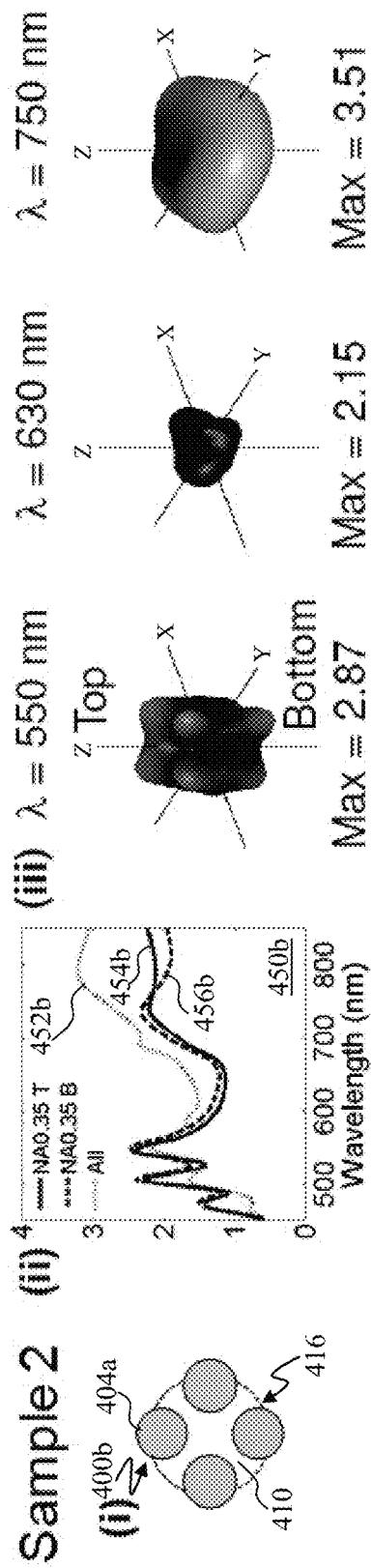
Figure 4C:
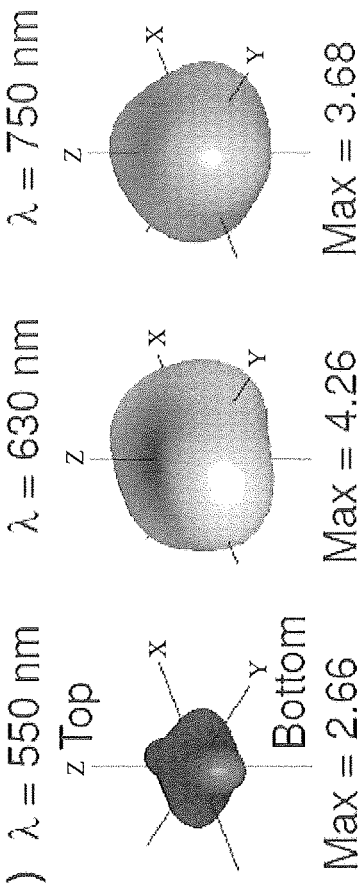
Figure 4D:
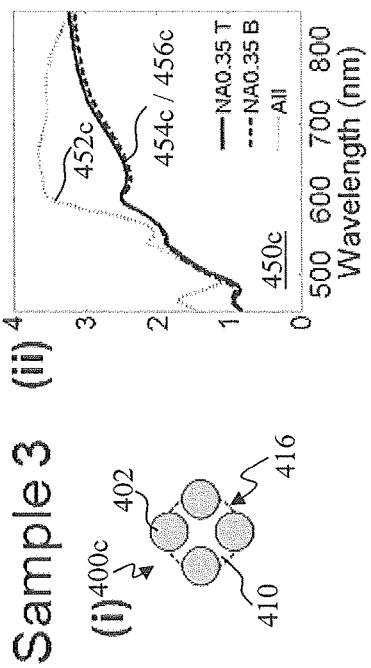
Figure 4E:
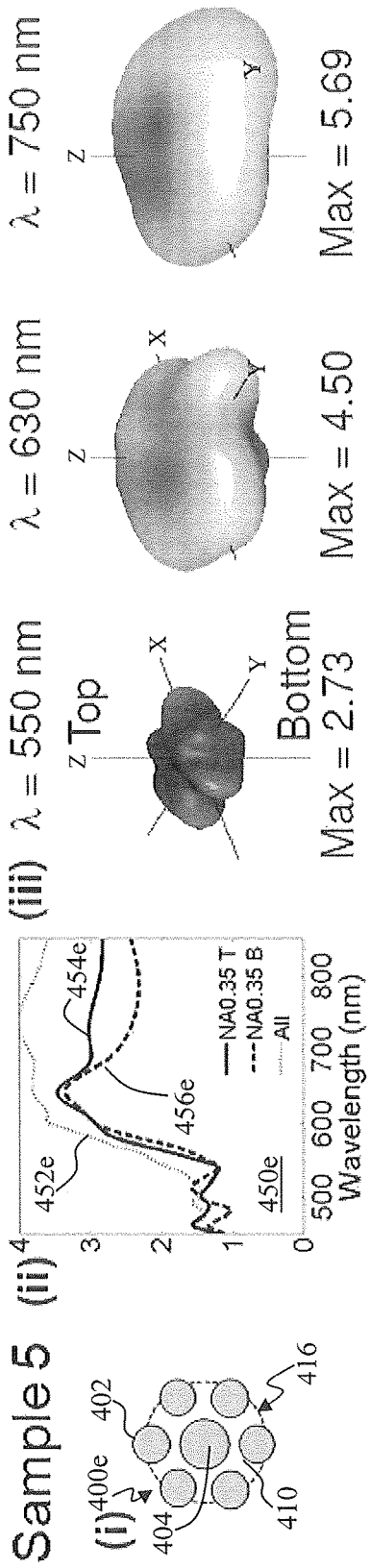
Figure 4F:
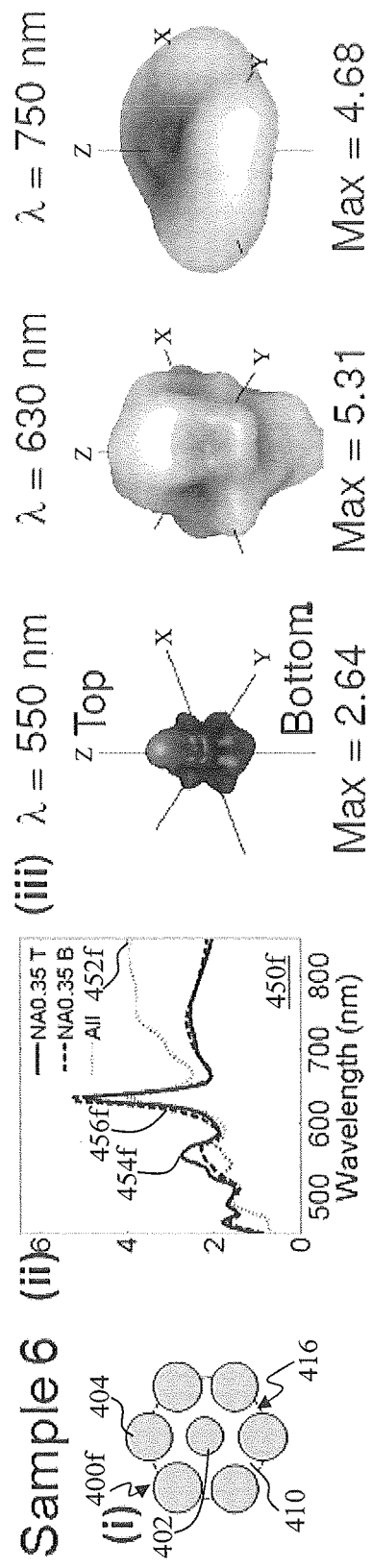
Figure 4G:
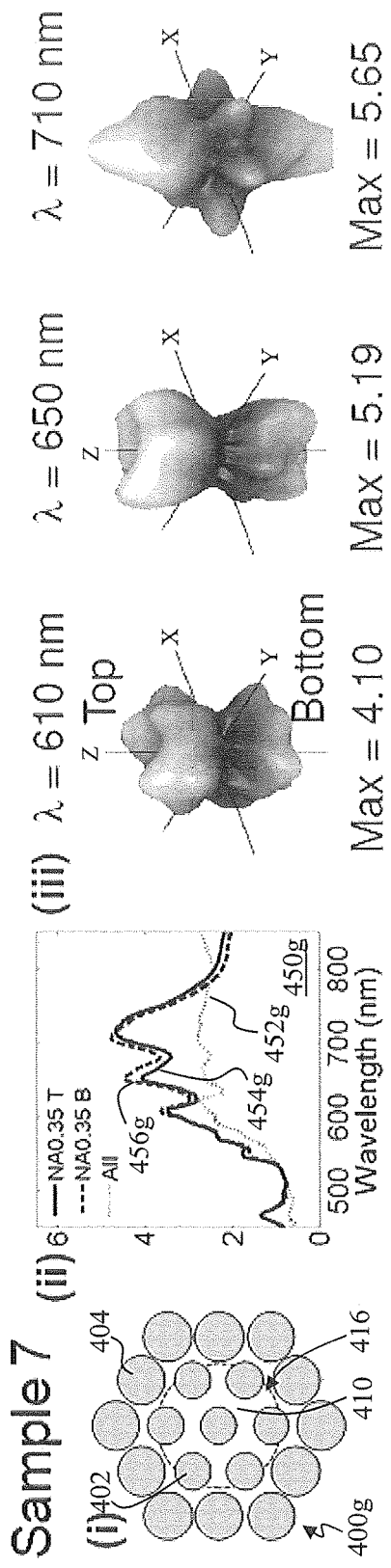
Figure 4H:
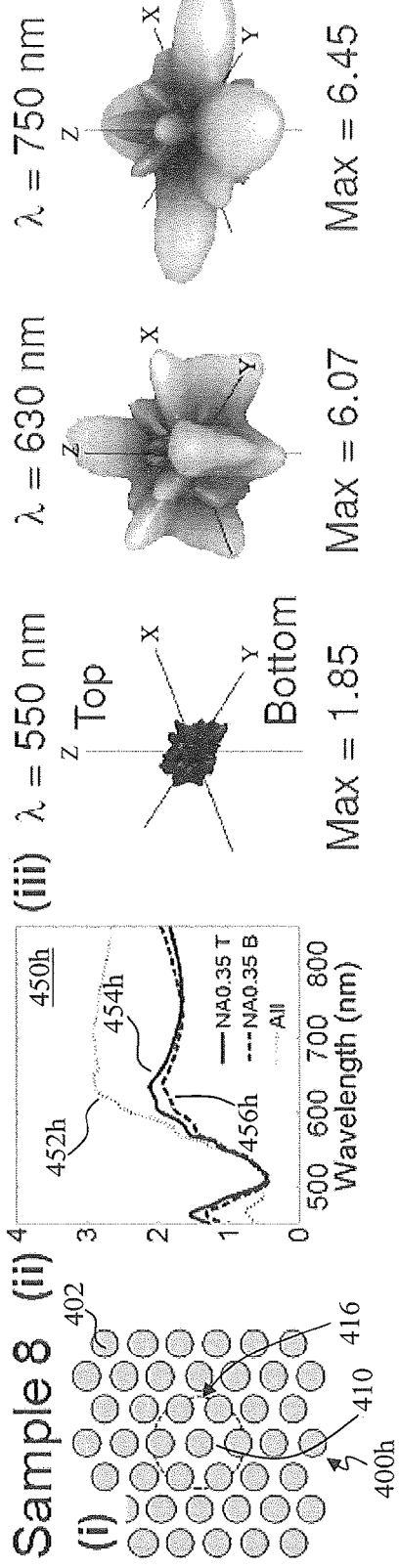
Figure 4K:
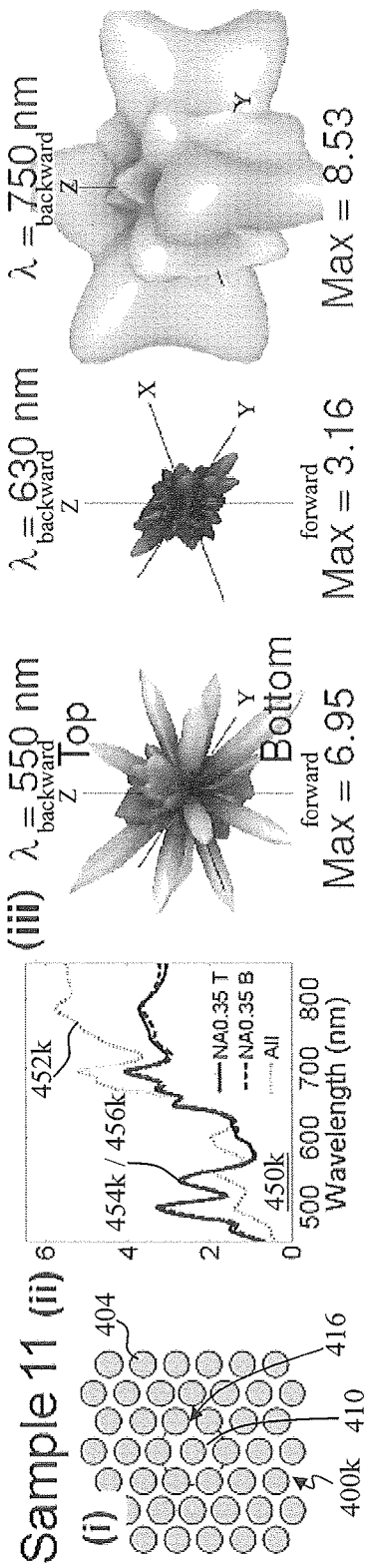
Figure 4L:
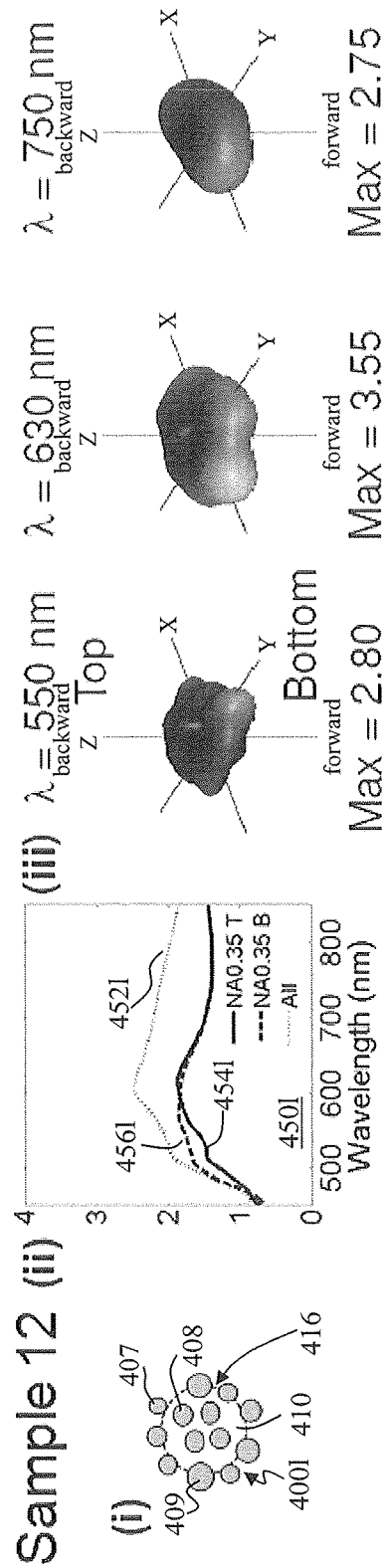
Figure 4M:
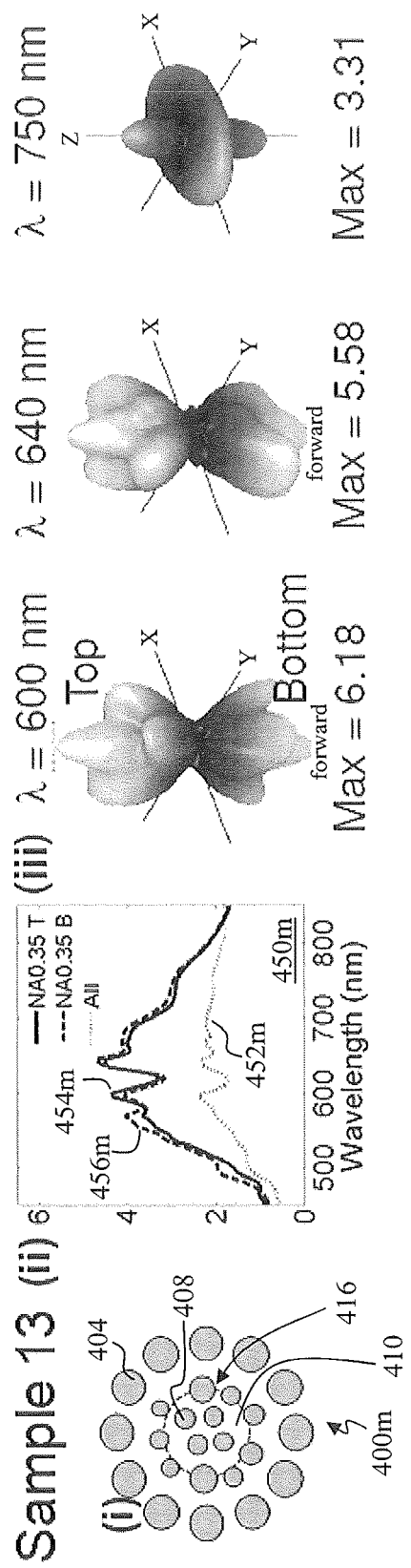
Figure 5A:
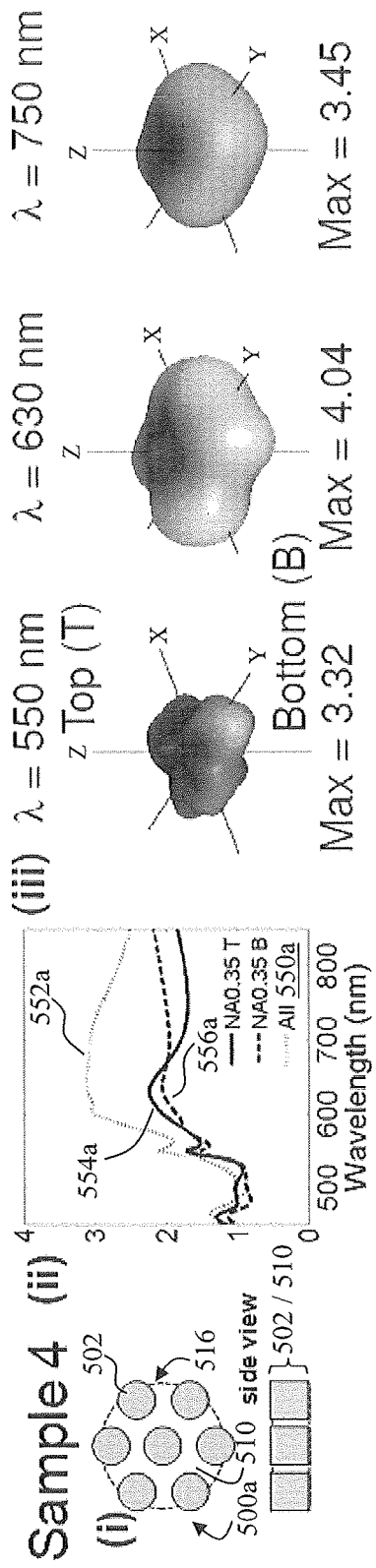
Figure 5B:
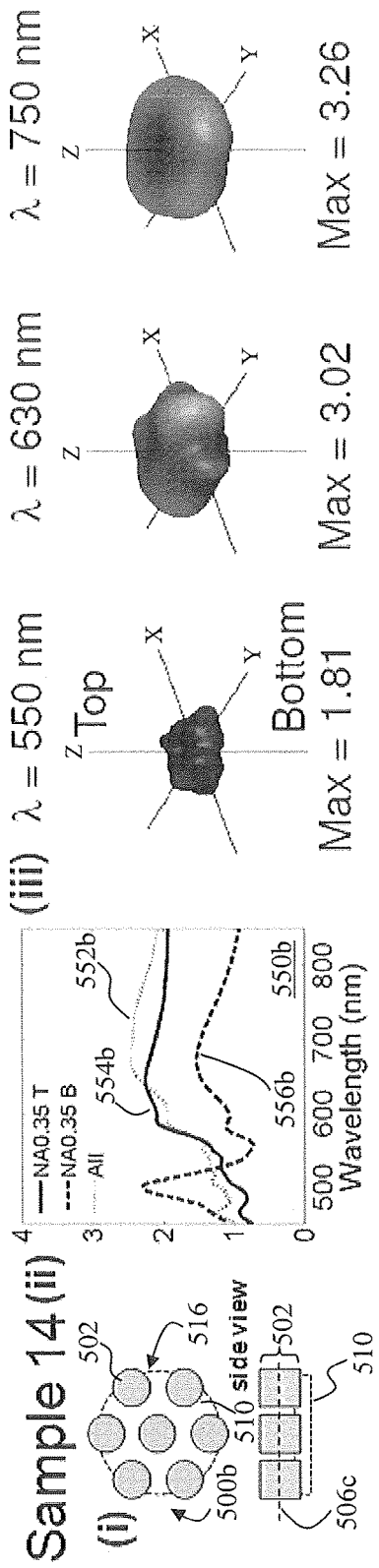
Figure 5E:
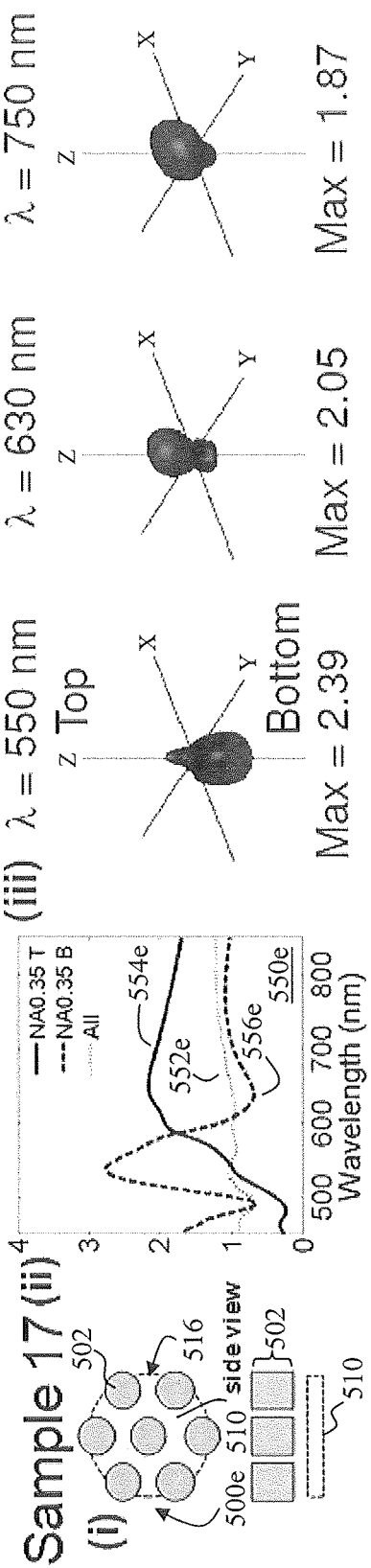

It may be seen in plot 450a of FIG. 4A that an enhancement factor of over 2.8 may be achieved in the presence of the nanoparticles 402 or the optical antenna (or nanoantenna) 400a. However, the emission diagram of this nanoantenna 400a is mostly aligned parallel to the nanoantenna plane (e.g., the X-Y plane), as may be observed in diagrams (iii) in FIG. 4A. It may be seen that enhancement integrated over all angles (dotted line 452a) is higher in this range over 600 nm than that in the direction perpendicular to the antenna plane (shown by results 454a, 456a).

Sample 2 (FIG. 4B) has a similar design as that for sample 1, but with an increased particle diameter of about 170 nm (see Table 1) for the four nanoparticles, as represented by 404a for one such nanoparticle. The height of the particles (or nanoparticles) 404a and the side-to-side separation between neighboring or adjacent nanoparticles 404a art left unchanged at about 150 nm and about 50 nm respectively. The four nanoparticles 404a are arranged in a square lattice or arrangement. The four nanoparticles 404a may be configured as a single element (unit cell) defining the optical antenna 400b. The diameter of the cylindrical area 416 with dipoles 410 is increased up to about 400 nm in accordance with the increase of the total nanoantenna size.

As shown in plot 450b, for Sample 2, the region of high enhancement is shifted to longer wavelengths above about 720 nm, in accordance with the shift of the magnetic resonance of the silicon nanoparticles 404a. Similar to Sample 1, in the high-enhancement range (wavelength, $\lambda$>720 nm), the emission diagram is mostly aligned parallel to the nanoantenna plane (e.g., the X-Y plane), as may be observed in diagrams (iii) in FIG. 4B. It may also be seen that, at the shorter wavelengths, there is another narrower enhancement range (e.g., wavelength between about 500 nm and about 580 nm). In this range, the emission pattern is more aligned perpendicular to the antenna plane, for example along the Z-axis (e.g., out of the page and into the page based on diagram (i) of FIG. 4B) and enhancement in the out of plane directions (results 454b, 456b) is higher than the total one (dotted line 452b). However, total luminescence enhancement in this range is lower than that at longer wavelengths and the spectral band is narrower. This example, Sample 2, shows that by increasing the nanoparticle size, it may be possible to shift the luminescence enhancement range to longer wavelengths. The spectral position of the magnetic and electric dipole resonances may be tuned from the visible to the near-IR and further to the IR and the microwave spectral ranges by changing the nanoparticle diameter from about 100 nm to micrometers (µm) and further to millimeters (mm). This shows that the nanoantenna operation range may be tuned from the visible to the IR, by scaling up the (nano)particle sizes.

Sample 3 is similar to Sample 1, but with a smaller side-to-side separation of about 30 nm between neighboring or adjacent nanoparticles 402 (see Table 1). The four nanoparticles 402 of the optical antenna 400c of Sample 3, as represented by 402 for one such nanoparticle, have the same nanoparticle diameter of about 120 nm, and are arranged in a square lattice or arrangement. The four nanoparticles 402 may be configured as a single element (unit cell) defining the optical antenna 400c. The diameter of the cylindrical area 416 with dipoles 410 is reduced to about 250 nm. It may be seen that the total enhancement of the nanoantenna 400c is increased but the emission patterns and the spectral behavior look very similar to those of Sample 1. This example, Sample 3, shows that by reducing the gaps (or side-to-side separation) between the nanoparticles 402 and increasing the proximity of the dipoles 410 to the nanoparticle surface, it may be possible, to increase the total luminescence enhancement without changing much of the spectral behavior.

Sample 4 has the same particle size (e.g., about 120 nm) for the four nanoparticles 402 and side-to-side separation (e.g., about 50 nm) between neighboring or adjacent nanoparticles 402 as those for Sample 1, but the particle arrangement is changed from a square lattice to a hexagonal lattice. The optical antenna 400d of Sample 4 may include seven nanoparticles 402 of the same diameter of about 120 nm arranged in a hexagonal arrangement. The seven nanoparticles 402 may be configured as a single element (unit cell) defining the optical antenna 400d. This more dense packing of the nanoparticles 402 in the optical antenna 400d may provide closer proximity of emitters (or dipoles) 410 to the nanoantenna elements (or nanoparticles) 402. This may lead to a slight increase of the total enhancement (maximum>3) but the directivity pattern is still similarly aligned along the nanoantenna plane (e.g., the X-Y plane). This example, Sample 4, shows that by increasing proximity of the emitters 410 to the nanoantenna elements 402 (e.g., the emitters 410 and the nanoparticles 402 becoming closer to each other), it may be possible to increase the total luminescence enhancement.

The method of various embodiments on how the nanoantenna structure may be designed in order to have both high total luminescence enhancement and high emission directivity perpendicular to the antenna plane in the same frequency range will now be described. The method may be based on using nanoparticles of different sizes (e.g., diameters) for the optical antenna (or nanoantenna) design. The smaller particles (e.g., enhancers) may provide high total luminescence enhancement coefficient in a particular broad spectral range (see, for example, Samples 1, 3, 4). On the other hand, the larger particles (e.g., reflectors) may provide high emission directivity in a direction perpendicular to the nanoantenna plane at the same frequency range (see, for example, Sample 2). By putting or employing (nano)particles of two or more different sizes together in an optical antenna, it may be possible to combine these spectral ranges and obtain high luminescence enhancement perpendicular to the nanoantenna plane. The bigger particles may work as reflectors/mirrors, which may block light propagation in the direction parallel to the nanoantenna plane and rotate the emission pattern towards the perpendicular direction relative to the nanoantenna plane.

The method and approach of various embodiments may be supported by several simulation examples as will be described below.

Sample 5 shows an example of an optical antenna (or nanoantenna) 400e with two different (nano)particle sizes, where a bigger (nano)particle 404 with a diameter of about 160 nm is placed in the center of a (nano)particle hexagon lattice similar to that of Sample 4, with nanoparticles 402 having a particle diameter of about 120 nm and a side-to-side separation of about 50 nm between neighboring or adjacent nanoparticles 402 (see Table 1). The smaller nanoparticles (e.g., first nanoparticles) 402 may at least substantially surround the larger nanoparticle (e.g., second nanoparticle) 404. The side-to-side separation between the nanoparticle 404 and each smaller nanoparticle 402 may be about 30 nm. Each nanoparticle 402, 404 may have a height of about 150 nm. The six nanoparticles 402 and the nanoparticle 404 may be configured as a single element (unit cell) defining the optical antenna 400*e*. The diameter of the cylindrical area 416 with dipoles 410 is about 400 nm.

It may be seen from plot 450*e* that the total enhancement is increased, which may be explained by improved (closer) proximity of the dipoles 410 to the (nano)particles 402, 404. Nevertheless, the directivity pattern is still aligned parallel to the nanoantenna plane (e.g., the X-Y plane). This may be because the nanoparticle 404, acting as the reflector, is located in the middle of the nanoantenna 400*e* and it reflects most of the emitted light (by the emitters 410) in the directions out of the center.

Sample 6 shows an example of an optical antenna structure with the same parameters as those for Sample 5, but with larger (nano)particles 404 on the outside and a small (nano)particle 402 on the inside. In other words, a nanoparticle 402 of a diameter of about 120 nm may be positioned at the centre of a hexagon lattice, and surrounded by larger nanoparticles 404 of a diameter of about 160 nm. The nanoparticles 404 may have a side-to-side separation of about 30 nm between neighboring or adjacent nanoparticles 404, while the side-to-side separation between the each nanoparticle 404 and the smaller nanoparticle 402 may be about 50 nm (see Table 1). Each nanoparticle 402, 404 may have a height of about 150 nm. The six nanoparticles 404 and the nanoparticle 402 may be configured as a single element (unit cell) defining the optical antenna 400*f*. The diameter of the cylindrical area 416 with dipoles 410 is about 400 nm.

In the case of Sample 6, the directivity pattern strongly changes and a strong enhancement peak appears at a wavelength of around 630 nm with a total out-of plane enhancement above 5 (see plot 450*f*). At this peak, the antenna emission is mostly aligned towards the direction perpendicular to the nanoantenna plane, where the nanoantenna plane may be defined as the X-Y plane. This may lead to the situation where the enhancement factor into a small solid angle (e.g., corresponding to a microscope objective with a numerical aperture (NA) of about 0.35 located on the top side and the bottom side of the nanoantenna plane, see FIG. 2) (e.g., results 454*f*, 456*f*) may significantly exceed the total enhancement in all directions (e.g., result 452*f*). The example of Sample 6 shows how a sufficient number of larger particles (reflectors) 404 may block in-plane antenna emission, thereby aligning the emission in a direction at least substantially perpendicular to the nanoantenna plane. This explanation or statement may be supported by the simulation results based on the optical antenna 400*g* of Sample 7.

Sample 7 may be similar to Sample 4 (e.g., the same antenna excited by the same dipoles), but additionally surrounded by a dense chain of larger nanoparticles (e.g., larger reflector particles) 404 with a diameter of about 160 nm and a side-to-side separation between neighboring or adjacent nanoparticles 404 of about 10 nm. The side-to-side separation between neighboring or adjacent nanoparticles 402 may be about 50 nm. The nanoparticles 402, 404 may be configured as a single element (unit cell) defining the optical antenna 400*g*.

It may be seen from plot 450*g* that the directional enhancement factor (e.g., into the microscope objective with a numerical aperture (NA) of about 0.35 located on the top side and the bottom side of the nanoantenna plane, see FIG. 2) has 3 peaks in the range of wavelengths from about 600 nm to about 750 nm, where it may be strongly enhanced. At these wavelengths, the in-plane emission is almost fully blocked by the nanoparticles (reflectors) 404 and the emission patterns or diagrams (see diagrams (iii) of FIG. 4G) are aligned perpendicular the nanoantenna plane.

The following four non-limiting examples show that a similar behavior may also be observed for different nanoparticle arrangements and/or also in large nanoparticle arrays.

Sample 8 is analogous to Sample 4, with similar (nano) particle sizes and side-to-side separations or distances, but with an increased number of nanoparticles, with up to 9 nanoparticles 402 in a single line of nanoparticles. The nanoparticles 402 may be configured as an array (e.g., an array of elements, with 7 nanoparticles 402 arranged in a hexagonal arrangement defining an element) defining the optical antenna 400*h*. The area 416 filled with the dipoles 410 is kept the same as in Sample 4, with about 400 nm in diameter. It may be seen from plot 450*h* that the spectral behavior of the enhancement factor is similar to that of Sample 4 (see-plots 450*d*, 450*h*). However, the directivity patterns look differently with more defined lobes (see diagrams (iii) of FIG. 4H), which are mostly oriented parallel to the nanoantenna plane (e.g., the X-Y plane).

Sample 9 is analogous to Sample 5, with similar (nano) particle sizes and side-to-side separations or distances, but with an increased number of nanoparticles, with up to 9 nanoparticles (including nanoparticles 402, 404) in a single line of nanoparticles. The nanoparticles 402, 404 may be configured as an array (e.g., an array of elements, with 6 nanoparticles 402 surrounding a central nanoparticle 404 of a larger diameter, with the nanoparticles 402, 404 arranged in a hexagonal arrangement defining an element) defining the optical antenna 400*i*. The area 416 filled with the dipoles 410 is kept the same as in Sample 5, with about 400 nm in diameter. In this case of Sample 9, in contrast to Sample 5, there is a spectral area with strong directivity enhancement at a wavelength of around 590 nm. This may be because, in the larger array of nanoparticles 402, 404, the emission area is surrounded by several large reflector (nano)particles 404, which may help to block emission in the in-plane direction. In Sample 5, the single reflector (nano)particle 404 is arranged the middle, which does not block the in-plane emission out-of center.

Sample 10 is analogous to Sample 6, with similar (nano) particle sizes and side-to-side separations or distances, but with an increased number of nanoparticles, with up to 9 nanoparticles (including nanoparticles 402, 404) in a single line of nanoparticles. The nanoparticles 402, 404 may be configured as an array (e.g., an array of elements, with 6 nanoparticles 404 surrounding a central nanoparticle 402 of a smaller diameter, with the nanoparticles 402, 404 arranged in a hexagonal arrangement defining an element) defining the optical antenna 400*j*. The area 416 filled with the dipoles 410 is kept the same as in Sample 6, with about 400 nm in diameter. It may be seen that the spectral behavior of the enhancement factor may change significantly, comparing the results shown in plots 450*f*, 450*j*. The reason is that the larger number of reflectors 404 may provide a better redirection of the radiation (or emission) towards or in the direction perpendicular to the nanoantenna plane. Two strong enhancement factor peaks may be observed at wavelengths of about 590 nm and about 630 nm, with the directional enhancement factor approaching 7 (see results 454j, 456j in plot 450j). The total enhancement at these wavelengths is not that high, at around 3 (see result 452j), and similar to previous samples, which shows the effect or dependence of antenna directivity for directional luminescence enhancement. The far-field emission patterns or diagrams (see diagrams (iii) in FIG. 4J) at these wavelengths are strongly aligned towards the directions perpendicular to the nanoantenna plane, which may make the whole emission pattern to be directed to the simulated collection angle (e.g., towards the top and bottom directions from the nanoantenna plane).

Sample 11 is analogous to Sample 8, but with larger nanoparticles 404 having a particle diameter of about 160 nm and a side-to-side separation between neighbouring or adjacent nanoparticles 404 of about 30 nm. The optical antenna 450k of Sample 11 may have an increased number of nanoparticles, with up to 9 nanoparticles 404 in a single line of nanoparticles. The nanoparticles 404 may be configured as an array (e.g., an array of elements, with 7 nanoparticles 404 arranged in a hexagonal arrangement defining an element) defining the optical antenna 400k. The area 416 filled with the dipoles 410 is kept the same as in Sample 8, with about 400 nm in diameter. It may be seen from plot 450k that the total luminescence (result 452k) in this case of Sample 11 is relatively high, up to 5, due to the smaller gaps between the larger (nano)particles 404. However, the directional enhancement (results 454k, 456k) is lower, below 4, through the whole spectral range of interest. This example of Sample 11 shows that the combination of at least two different (nano)particle sizes may be important to obtain high luminescence enhancement out of plane. Neither small particles nor large particles alone may lead to the same high performance offered by a combination of nanoparticles of at least two different sizes or cross-sectional dimensions (or diameters).

As described above, the above-mentioned examples show that, by using nanoparticles of different sizes, it may be possible to both strongly enhance the total luminescence of the emitters and align the emission pattern towards the direction perpendicular to the nanoantenna plane (e.g., potentially towards a detector). It should be appreciated that this is not only valid for the nanoparticle arrangements shown herein, e.g., in FIGS. 4A to 4K, but may be applied to various geometries or arrangements with different (nano) particle sizes (e.g., diameters). Two, three or more different (nano)particle sizes (e.g., diameters) may be used for the design of a single (optical) antenna to provide broadband high-enhancement performance. This statement may be supported by simulation of a sample with a random distribution of silicon cylinders or nanoparticles with random sizes.

In Sample 12, thirteen nanoparticles or cylinders with diameters randomly varied between about 80 nm and about 120 nm are randomly positioned with side-to-side separations varied between about 30 nm and about 100 nm. Three nanoparticles of different diameters for the optical antenna 450l are represented by 407, 408, 409. The height of the nanoparticles or cylinders (e.g., 407, 408, 409) may be fixed at about 150 nm as in the above-mentioned samples. The area 416 filled with the dipoles 410 is kept the same as in Sample 4, with about 400 nm in diameter. It may be seen from plot 450l that this random arrangement may provide a broadband total luminescence enhancement at the level of about 2 in the spectral range of wavelengths from about 500 nm to about 800 nm. The directivity pattern is mostly aligned in the in-plane direction (see diagrams (iii) in FIG. 4L) leading to low (enhancement factor<2, see plot 450l) directional enhancement values.

In Sample 13, the same antenna structure with the same dipole distribution as in Sample 12, is surrounded by an additional chain of large reflector (nano)particles 404 with diameters of about 160 nm and a side-to-side separation of about 50 nm between adjacent nanoparticles 404. It may be clearly seen that the addition of reflectors 404 surrounding the emission area may lead to a strong luminescence enhancement in the out-of-plane direction with a directional enhancement coefficient above 4 (see plot 450m). It may also be seen that the total enhancement (result 452m) may be almost unchanged (the same level below 2.5) and the main change is related to improved directivity, e.g., as indicated by results 454m, 456m.

The examples of Samples 12 and 13 show that the particular arrangement of (nano)particles may not play a significant role. The approach in various embodiments to achieve a high out-of-plane (relative to the nanoantenna plane) directional emission is to surround the emission area with a sufficient number of larger reflecting particles (e.g., nanoparticles 404) to block the in-plane emission. Also, the sizes (e.g., diameters) of the (nano)particles may be varied with the only condition that the enhancement range of the smaller particles (enhancers) may be overlapped with the reflection range of the larger particles (reflectors).

FIGS. 5A to 5E show results and performance of optical antennas based on resonant silicon nanoparticles (e.g., in the form of cylinders), according to various embodiments. The silicon cylinders may be excited by emitters (or light sources) displaced relative to the centre (e.g., central plane) of the optical antennas or the centre (e.g., central plane) of the nanoparticles.

The results shown in FIGS. 5A to 5E demonstrate how the position of the emitters (or light sources) relative to the center of the (optical) antenna may influence the antenna performance. Diagrams indicated as (i) in FIGS. 5A to 5E show schematic top views (upper portion of diagram (i)) and schematic cross-sectional views (lower portion of diagram (i)) of the different simulated nanoantenna structures and the relative position of the emitters (or dipoles) 510.

For Sample 4 (FIG. 5A), the dipole emitters 510 are distributed around the antenna, defined by the nanoparticles 502, throughout the whole of its height, in a cylindrical area 516 with a diameter of about 400 nm diameter and a height of about 150 nm.

For Samples 14 to 17 (FIGS. 5B to 5E), the nanoantenna design, the geometry and parameters of the antennas are chosen to be similar to Sample 4. Each optical antenna (or nanoantenna) 500b, 500c, 500d, 500e, is excited by 50 randomly oriented dipoles 510 distributed around the nanoparticles 502 defining the antenna 500b, 500c, 500d, 500e, in a cylindrical area 516 with the same diameter of about 400 nm diameter as for Sample 4, but with a height of about 50 nm and displaced relative to the center (e.g., central plane) of the nanoparticles 502. The center or the central plane of the nanoparticles 502 is illustrated by the dashed line 506c in Sample 14 of FIG. 5B as an example, and applicable also to the other samples. In Samples 14, 15, 16 and 17, the geometrical center of the emitter's area is displaced by about 75 nm, about 100 nm, about 125 nm, and about 150 nm respectively in the bottom (downward) direction relative to the geometrical center 506c of the nanoantenna or the nanoparticles 502. This may mean that the dipoles 510 for Samples 14 to 17 may be displaced vertically downward relative to the center plane 506c of the nanoparticles 502, to be arranged below the nanoparticles 502. In some embodiments, the dipoles 510 may be displaced vertically upward relative to the center plane 506c.

Diagrams indicated as (ii) in FIGS. 5A to 5E show plots 550a, 550b, 550c. 550d. 550e, of enhancement factor provided by the nanoparticles 502 or the nanoantennas 500a, 500b, . . . , 500e calculated as a ratio of the emission signal into a particular solid angle by 50 randomly distributed and oriented dipoles with antenna and without it. The diagrams illustrate the total emission (dotted lines 552a, 552b, . . . , 552e) and the emission perpendicular to the nanoantenna plane into a solid angle corresponding to an objective with about 0.35 NA from the top (solid lines 554a, 554b, . . . , 554c) of the nanoantenna 500a, 500b, . . . , 500e, or the nanoantenna plane 506c, and from the bottom (dashed lines 556a, 556b, . . . , 556e) of the nanoantennas 500a, 500b, . . . , 500e, or the nanoantenna plane 506c.

Diagrams indicated as (iii) in FIGS. 5A to 5E show far-field emission diagrams of the nanoparticles (e.g., 502) or the nanoantennas 500a, 500b, . . . , 500e, excited by 50 randomly distributed and oriented electric dipoles 510 at three different wavelengths of emission specified in each of FIGS. SA to 5E.

It may be seen from plots 550a, 550b, . . . , 550e, in FIGS. SA to 5E that the total luminescence enhancement (dotted lines 552b, . . . , 552e) drops when the distance between the emitters 510 and the nanoparticles (or nanoantenna elements) 502 is increased.

However, as may be observed in results 554b, . . . , 554e and diagrams (iii) in FIGS. 5B to 5E, at the long-wavelength side or region (e.g., wavelengths>600 nm), the emission pattern may align towards the top direction, which may keep or direct the signal of the directional enhancement in the top direction at the same level as in Sample 4. On the other hand, as may be observed in results 556b, . . . , 556e and diagrams (iii) in FIGS. 5B to 5E, at the short-wavelength side or region (e.g., wavelengths about 500-600 nm), there may be a strong enhancement of directivity to the bottom direction, which may provide a directional enhancement signal above about 2.5—larger than in the symmetrical case of Sample 4.

The above-mentioned examples of Samples 4 and 14 to 17 show that even if localized emitters (or light sources) 410 are not or cannot be distributed between or among the nanoparticles (e.g., 402) defining the nanoantenna elements, for some measurement limitations (for example, due to surface tension forces and/or hydrophobicity of their solvent), the optical antenna (or nanoantenna) designs of various embodiments may still enhance the signal collected out-of-plane due to directional emission provided by the nanoparticles, acting as nanoantennas.

As described above, various embodiments provide designs of optical antennas or nanoantennas for enhancement of luminescence of localized light sources (e.g., fluorophores, dyes, quantum dots, etc.) in a direction perpendicular to the nanoantenna plane. The antennas may include or consist of agglomerates/arrays/structures of resonant nanoparticles made of high-refractive index (e.g., n≥2) dielectric or semiconductor materials. Various embodiments also provide methods to tailor both high-luminescence enhancement spectral regions and nanoantenna directivity patterns. For example, various embodiments may provide optical antennas or nanoantennas including or consisting of nanoparticles with different sizes (e.g., smaller enhancers and larger reflectors), which may provide both high luminescence enhancement and directivity aligned along the direction perpendicular to the nanoantenna plane combined at the same spectral range. This may be useful for strong enhancement of the luminescence signal detection out-of-plane.

The dielectric or semiconductor nanoparticles defining the optical antennas (or nanoantennas) may have lower losses than nanoantennas based on plasmonic materials (e.g., gold, silver, etc.). This may reduce heating of the nanoantennas by the emitted light. This may also allow fabrication of dense nanoantenna arrays without losing transmission through the substrate of the nanoantenna.

The optical antenna or nanoantenna designs of various embodiments may have or may provide high emission directivity in the direction perpendicular to the (nano)antenna plane, which may enable efficient out-of-plane detection of emission (e.g., luminescence, fluorescence, etc) signal.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical antenna comprising:
   at least one first particle;
   at least one second particle having a diameter that is larger than a diameter of the at least one first particle; and
   at least one light source interposed between the at least one first particle and the at least one second particle, the at least one light source configured to provide the optical signal;
   wherein the at least one first particle and the at least one second particle are arranged along a plane, and
   wherein the at least one first particle is configured to enhance an optical emission of the at least one light source providing an optical signal to the optical antenna and the at least one second particle is configured to direct the optical signal in the form of an inverted cone perpendicular to the plane.

2. The optical antenna as claimed in claim 1, wherein each of the at least one first particle and the at least one second particle is made of a material having a refractive index of at least two.

3. The optical antenna as claimed in claim 2, wherein the material is a dielectric material or a semiconductor material.

4. The optical antenna as claimed in claim 1, wherein each of the at least one first particle and the at least one second particle comprises a nanoparticle.

5. The optical antenna as claimed in claim 2, wherein the material is silicon.

6. The optical antenna as claimed in claim 4, wherein the nanoparticle of the at least one first particle is made of silicon, has a cylindrical shape, and has a height of about 150 nm±50 nm and a diameter of about 120 nm±40 nm.

7. The optical antenna as claimed in claim 4, wherein the nanoparticle of the at least one second particle is made of silicon, has a cylindrical shape, has a height of about 150 nm±50 nm and a diameter of about 160 nm±40 nm.

8. The optical antenna as claimed in claim 1, wherein the at least one first particle and the at least one second particle are arranged in contact with each other.

9. The optical antenna as claimed in claim 1, wherein the at least one first particle and the at least one second particle are arranged spaced apart from each other.

10. The optical antenna as claimed in claim 9, wherein a side-to-side separation of the at least one first particle and the at least one second particle is in a range of between about 10 nm and about 100 nm.

11. The optical antenna as claimed in claim 1, further comprising:
a plurality of second particles arranged along the plane and at least substantially surrounding the at least one first particle,
wherein each second particle has a diameter that is larger than the diameter of the at least one first particle.

12. The optical antenna as claimed in claim 1, further comprising:
a plurality of first particles; and
a plurality of second particles at least substantially surrounding the plurality of first particles, the plurality of first particles and the plurality of second particles being arranged along the plane,
wherein each second particle has a diameter that is larger than a diameter of each first particle.

13. The optical antenna as claimed in claim 1, further comprising:
a plurality of first particles; and
a plurality of second particles arranged interposed among the plurality of first particles, the plurality of first particles and the plurality of second particles being arranged along the plane,
wherein each second particle has a diameter that is larger than a diameter of each first particle.

14. The optical antenna as claimed in claim 1, further comprising:
a plurality of first particles and a plurality of second particles arranged alternately along the plane,
wherein each second particle has a diameter that is larger than a diameter of each first particle.

15. The optical antenna as claimed in claim 1, wherein the at least one light source comprises at least one of a fluorophore, a quantum dot or a dye.

16. The optical antenna as claimed in claim 1, further comprising a plurality of light sources configured to provide the optical signal.

17. The optical antenna as claimed in claim 1, further comprising a substrate on which the at least one first particle and the at least one second particle are formed.

18. The optical antenna as claimed in claim 1, wherein the optical emission of the at least one light source comprises an emission rate of the at least one light source or an intensity of the optical emission of the at least one light source.

19. The optical antenna as claimed in claim 1, wherein each of the at least one first particle and the at least one second particle comprises a cylindrical particle, a cuboidal particle, a prismatic particle, or a spherical particle.

* * * * *